United States Patent
Iguchi et al.

(10) Patent No.: US 7,162,645 B2
(45) Date of Patent: Jan. 9, 2007

(54) STORAGE DEVICE INCLUDING A NON-VOLATILE MEMORY

(75) Inventors: Shinya Iguchi, Fujisawa (JP); Takashi Tsunehiro, Ebina (JP); Motoyasu Tsunoda, Sagamihara (JP); Haruji Ishihara, Kawaguchi (JP); Nagamasa Mizushima, Fujisawa (JP); Takashi Totsuka, Machida (JP)

(73) Assignee: Renesas Technology Corp., Tokyo (JP)

( * ) Notice: Subject to any disclaimer, the term of this patent is extended or adjusted under 35 U.S.C. 154(b) by 870 days.

(21) Appl. No.: 10/062,451

(22) Filed: Feb. 5, 2002

(65) Prior Publication Data

US 2002/0169960 A1    Nov. 14, 2002

(30) Foreign Application Priority Data

Feb. 7, 2001    (JP)    ............... 2001-030384

(51) Int. Cl.
  *G06F 12/14*    (2006.01)
  *H04L 9/00*    (2006.01)
(52) U.S. Cl. .................. 713/193; 713/167; 726/26
(58) Field of Classification Search ................ 713/193, 713/152; 380/286
  See application file for complete search history.

(56) References Cited

U.S. PATENT DOCUMENTS

| | | | | |
|---|---|---|---|---|
| 4,281,216 A | * | 7/1981 | Hogg et al. ................. 380/277 |
| 4,853,522 A | * | 8/1989 | Ogasawara ................. 235/380 |
| 4,885,788 A | * | 12/1989 | Takaragi et al. ............. 705/67 |
| 5,235,641 A | * | 8/1993 | Nozawa et al. ............. 713/193 |
| 5,309,516 A | * | 5/1994 | Takaragi et al. ............. 380/45 |
| 5,719,387 A | * | 2/1998 | Fujioka ..................... 235/492 |
| 5,805,712 A | * | 9/1998 | Davis ....................... 713/173 |
| 5,917,915 A | * | 6/1999 | Hirose ...................... 380/228 |
| 5,923,884 A | * | 7/1999 | Peyret et al. .............. 717/167 |
| 6,115,816 A | * | 9/2000 | Davis ....................... 713/153 |
| 6,141,752 A | * | 10/2000 | Dancs et al. ............... 713/172 |
| 6,158,004 A | * | 12/2000 | Mason et al. .............. 713/200 |
| 6,209,098 B1 | * | 3/2001 | Davis ....................... 713/194 |
| 6,229,731 B1 | * | 5/2001 | Kasai et al. ........... 365/185.04 |
| 6,298,421 B1 | * | 10/2001 | Minamizawa et al. ...... 711/151 |
| 6,427,140 B1 | * | 7/2002 | Ginter et al. ................ 705/80 |
| 6,618,789 B1 | * | 9/2003 | Okaue et al. .............. 711/103 |
| 6,871,278 B1 | * | 3/2005 | Sciupac ..................... 713/185 |

FOREIGN PATENT DOCUMENTS

| | | |
|---|---|---|
| JP | 10-334205 | 12/1998 |
| JP | 2000-163547 | 6/2000 |
| JP | 2001-109666 | 4/2001 |
| WO | 00/65602 | 11/2000 |

* cited by examiner

*Primary Examiner*—Jacques Louis-Jacques
*Assistant Examiner*—Thomas Szymanski
(74) *Attorney, Agent, or Firm*—Mattingly, Stanger, Malur & Brundidge, P.C.

(57) ABSTRACT

A storage device includes a tamper-resistant module and a flash memory. In correspondence with a command, a CPU inside the tamper-resistant module judges the security of data received from the outside, then recording the data as follows: High-security and small-capacity data is recorded into a memory inside the tamper-resistant module. High-security and large-capacity data is encrypted, then being recorded into the flash memory. Low-security data is recorded as it is into the flash memory. This recording method permits large-capacity data to be stored while ensuring a security (i.e., a security level) corresponding thereto.

15 Claims, 22 Drawing Sheets

FIG.19A

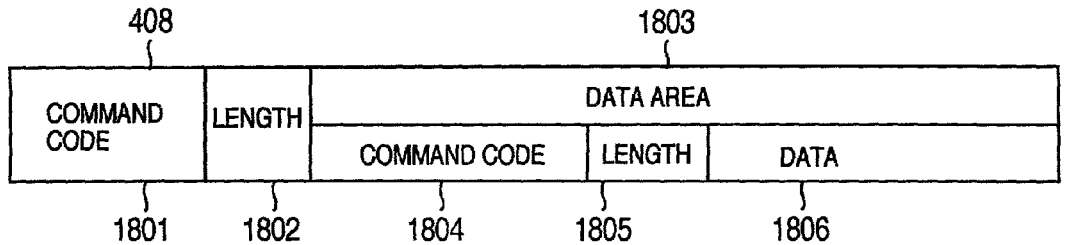

FIG.19B

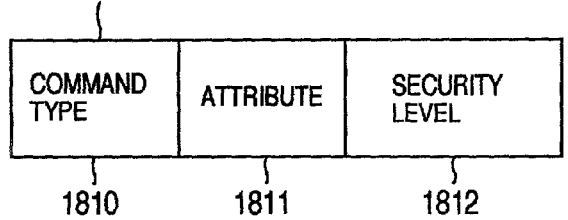

FIG.19C

| COMMAND TYPE | ATTRIBUTE |
|---|---|
| READ | STORAGE ADDRESS, DATA LENGTH |
| WRITE | STORAGE ADDRESS, DATA LENGTH, DATA ATTRIBUTE |
| PROCESS ENCRYPTION | TARGET SECRET INFORMATION, PROCESSING TYPE (ENCRYPTION, DECRYPTION, CERTIFICATION, SIGNATURE) |
| EXECUTE APPLICATION | TARGET SECRET INFORMATION, APPLICATION IDENTIFICATION NUMBER |
| COMMAND APPLICATION | DEPEND ON APPLICATION IN EXECUTION |

| SECURITY LEVEL | EXPLANATION |
|---|---|
| 1 | STORE INTO NV MEMORY |
| 2 | ENCRYPT AND THEN OUTPUT TO EXTERNAL MEMORY |
| 3 | NO NEED OF ENCRYPTION |

| NAME | NOTATION | DATA LOCATION | MEANING |
|---|---|---|---|
| ENCRYPTION | B(K,D) | — | ENCRYPTION RESULT OF INFORMATION D WITH A KEY K |
| CONCATENATION | A‖B | — | INFORMATION RESULTING FROM CONCATENATING INFORMATION A WITH INFORMATION B |
| CONTENT ID | ContentID | — | NUMBER ALLOCATED TO EACH CONTENT |
| ROOT PRIVATE KEY | Ka | SECRET INFORMATION Ki | PRIVATE KEY PROTECTED SECURELY BY CA |
| MEDIA-CLASS PRIVATE KEY | Kmcx | SECRET INFORMATION Ki | KEY THAT CHIPS OF ONE AND THE SAME MEDIA CLASS (I.E., LOT) SECRETLY POSSESS INSIDE CHIPS |
| MEDIA-CLASS PUBLIC KEY | KPmcx | SECRET INFORMATION Ki | PUBLIC KEY CORRESPONDING TO Kmcx |
| RELATED INFORMATION | Ixx | SECRET INFORMATION Ki | VARIOUS TYPES OF INFORMATION RELATED WITH xx |
| CERTIFICATE | C(Ka,KPxx‖Ixx) | SECRET INFORMATION Ki | CERTIFICATE OF PUBLIC KEY KPxx KPxx‖Ixx‖E(Ke,H(KPxx‖Ixx)) |
| TRANSACTION ID | Transzaction ID | SERVER | VALUE OF IDENTIFIER THAT IS UNIQUE FOR EACH TRANSACTION |
| SESSION KEY | Ksx | SERVER AND SECRET INFORMATION Ki | TENTATIVE KEY OF SYMMETRIC-KEY CRYPTOSYSTEM SHARED BETWEEN COMMUNICATIONS ENTITIES PER EACH COMMUNICATIONS SESSION |
| MEDIA-INDIVIDUAL PRIVATE KEY | Kmx | SECRET INFORMATION Ki | KEY THAT EACH MEDIUM POSSESSES INDIVIDUALLY AND SECRETLY |
| MEDIA-INDIVIDUAL PUBLIC KEY | KPmx | SECRET INFORMATION Km | PUBLIC KEY CORRESPONDING TO Kmx |
| CRL-UPDATED TIME AND DATE | CRLUpdate | SECRET INFORMATION Ki | TIME AND DATE WHEN CRL HAD BEEN UPDATED |
| MEDIA ACCESS CONDITION | ACm | LICENSE INFORMATION | ACCESS CONDITIONS THAT DELIVERY SOURCE HAS ENFORCED CONCERNING PROCESSING OF DATA INSIDE MEDIUM |
| DECODER ACCESS CONDITION | ACp | LICENSE INFORMATION | ACCESS CONDITIONS THAT DELIVERY SOURCE HAS ENFORCED CONCERNING PROCESSING OF DATA INSIDE DECODER CHIP |
| CONTENT KEY | Kc | LICENSE INFORMATION | CONTENT-ENCRYPTING KEY THAT DIFFERS FOR EACH CONTENT |

STORAGE DEVICE INCLUDING A NON-VOLATILE MEMORY

BACKGROUND OF THE INVENTION

The present invention relates to a storage device and an information appliance connected to the storage device. In particular, it relates to a method of controlling the data transfer between the information appliance and the storage device.

In recent years, the development of the network society based on the Internet and so on has been increasing the importance of a technology for protecting the copyright of the content such as music and an image circulated on the network. As the copyright-protecting technology, there has been proposed a memory IC card. The memory IC card mounts thereon a private-key storing circuit for storing a private key used for the encryption/decryption and a data storing circuit for saving the data, and also has a function of using a writing-in controlling circuit so as to write the private key into the private-key storing circuit and a function of authenticating the opposite appliance. This technology has been disclosed in, e.g., JP-A-2000-163547.

In JP-A-2000-163547, all the data are recorded in a storage medium on a packaged storage device such as the memory IC card. In order to prevent the stealing of the content or the like, the packaged storage device such as the memory IC card has a structure (i.e., a tamper-resistant module) that is configured so that analyzing the inside data from the outside is difficult. Generally speaking, however, the packaged storage device such as the memory IC card having the tamper-resistant module is expensive, and its memory's storage-capacity is small. Consequently, it was very difficult to store high-security data in large quantities into the packaged storage device such as the memory IC card.

Also, in JP-A-2000-163547, the packaged storage device such as the memory IC card has stored the high-security data and low-security data together into the tamper-resistant module. Namely, the device has done this without making a judgement on the differentiation of the high-security data and the low-security data just in response to a transfer instruction from a higher-order device. This has resulted in a state where data that need not be secured have also been all stored into the tamper-resistant module, thereby making it impossible to effectively utilize the storage area within the tamper-resistant module.

Also, in JP-A-2000-163547, a non-volatile memory (hereinafter, referred to as "an NV memory") such as an EEPROM has been used as the data-saving storage area. Concerning the NV memory used in the prior art, however, its rewritable number is small and accordingly it was difficult to replace the content many times.

Moreover, in JP-A-2000-163547, the packaged storage device such as the memory IC card, as described above, is small in its storage-capacity. This condition, even when applications are executed on the memory IC card, has allowed only the execution of an application whose program uses just a small storage-capacity.

Meanwhile, in JP-A-10-334205, there has been disclosed a card where an IC chip and a flash memory are built-in. However, since the IC chip and the flash memory are independent of each other, it is impossible for the IC chip to write or read the data into or from the flash memory.

SUMMARY OF THE INVENTION

It is an object of the present invention to provide a storage device and a host terminal device that allow high-security data to be stored at a low-cost and in large quantities many times.

It is another object of the present invention to provide the storage device and the host terminal device that are capable of effectively utilizing a record area inside a controller.

It is still another object of the present invention to provide the storage device and the host terminal device that are capable of recording a variety of applications and of executing even a large-sized application.

In the present invention, private data is recorded in advance into a non-volatile memory inside the controller. Meanwhile, information that cannot be recorded into the non-volatile memory inside the controller is written into a non-volatile memory outside the controller after the information has been encrypted using a private key.

In the present invention, the controller judges the security (i.e., the security level or the like) of information transmitted from the outside. Moreover, the controller divides the data so that the high-security information will be recorded into the non-volatile memory inside the controller and the low-security information will be recorded into a flash memory.

In the present invention, there is mounted a work memory (e.g., a RAM) for executing an application inside the controller. In addition, the application is encrypted using the private key inside the controller, then being stored into an access-limited area in the non-volatile memory outside the controller.

Furthermore, as required, the application is read out from the non-volatile memory outside the controller so as to be decrypted and expanded onto the work memory, then being executed.

The present invention permits large-capacity data to be stored while ensuring a security (i.e., a security level) corresponding thereto.

Other objects, features and advantages of the invention will become apparent from the following description of the embodiments of the invention taken in conjunction with the accompanying drawings.

BRIEF DESCRIPTION OF THE DRAWINGS

FIGS. 19A to 19D are diagrams for illustrating the configurations of access commands in the present invention;

FIG. 22 is a diagram for explaining a table notation definition used in the present invention.

DESCRIPTION OF THE EMBODIMENTS

Figure 1:
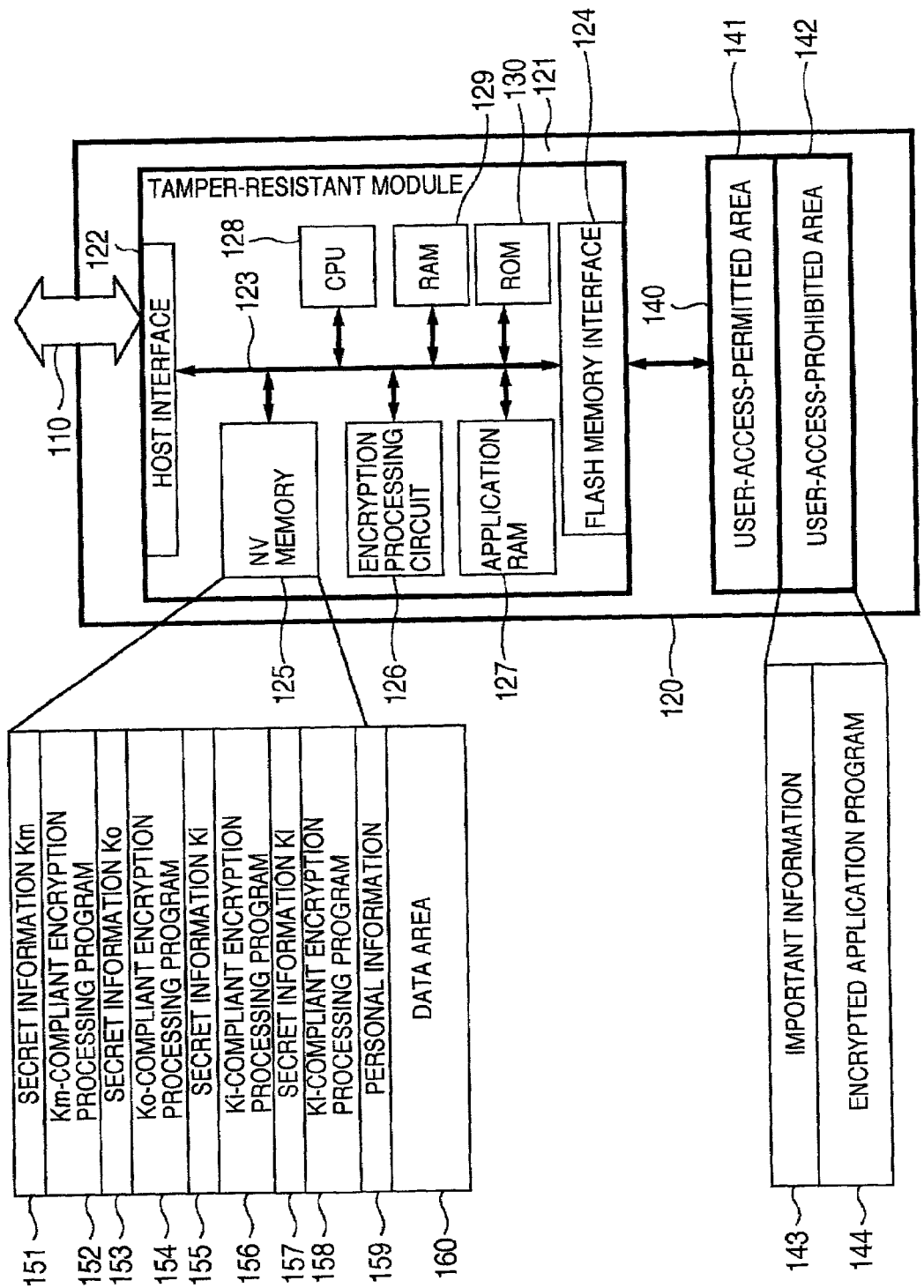
FIG. 1 is a configuration diagram for illustrating an embodiment of a storage device to which the present invention has been applied.

FIG. 1 is the configuration diagram of a storage device 120 to which the present invention has been applied.

The storage device 120 includes a tamper-resistant module 121 and a flash memory 140. The tamper-resistant module 121, which is an electronic circuit configured so that performing the physical analysis from the outside is difficult, is used in an electronic appliance such as an IC card which is required to exhibit a high-level security. Namely, the tamper-resistant characteristic of the tamper-resistant module 121 is higher than that of the flash memory 140. An inside bus 123 is used for transmitting/receiving information among the respective circuits. A flash memory interface 124 is used for connecting the flash memory 140 to the tamper-resistant module 121.

A host interface 122 is used for transmitting/receiving an access command 110 between the storage device 120 and an external appliance connected to the storage device 120. A CPU 128 controls the respective circuits inside the storage device 120. The CPU 128 uses an encryption processing circuit 126 in order to perform an encryption processing inside the storage device 120. A RAM 129 is a work RAM (i.e., a work memory) used for recording data temporarily. A ROM 130 records programs and data that the CPU 128 permanently utilizes. An NV memory 125 is a small storage-capacity non-volatile memory whose writable number is small. The NV memory 125 records the type of information that is dangerous if analyzed from the outside. As the NV memory 125, there exists, e.g., an EEPROM (i.e., an electrically rewritable ROM).

The NV memory 125 stores the following information and programs:

Secret information KM 151 includes information on a key or the like that is used in order to encrypt or decrypt data when the tamper-resistant module 121 reads or writes the data toward the flash memory 140. A KM-compliant encryption processing program 152 is an application for performing the encryption processing by using the secret information KM 151.

Secret information KO 153 includes information on a certificate, a key, or the like that is used by a server 180 of a service provider 100 and a mobile terminal 103 in order to establish an encrypted communications-path on a public line 108 described later. A KO-compliant encryption processing program 154 is an application for performing the encryption processing by using the secret information KO 153.

Secret information KI 155 includes information on a storage device certificate, a key, or the like that is used by a delivery application 181 inside the server 180 of the service provider 100 and the storage device 120 in order to establish an encrypted inside-communications-path 109 described later. A KI-compliant encryption processing program 156 is an application for performing the encryption processing by using the secret information KI 155.

Secret information KL 157 includes information on a certificate, a key, or the like that is needed when an application executed by the CPU 128 performs an encryption processing. A KL-compliant encryption processing program 158 is an application for performing the encryption processing by using the secret information KL 157. Incidentally, there are some cases where, depending on an application, KL 157 is used for a specific purpose of its own, and there are other cases where KL 157 exist in plural number for each application.

The NV memory 125 includes a data area 160. The data area 160 stores the personal information on a user of the storage device 120, e.g., the telephone number, the schedule, the credit card information, the electronic cash, and the individual certification information.

Although it can be considered that the above-described important personal information (i.e., the key information and the like) is stored into the flash memory 140, the personal information is stored into the NV memory 125 in the tamper-resistant module 121 that is configured so that the reading-out from the outside is difficult. This is because there exists a possibility that a person of malice may destroy the card so as to steal the personal information.

An application RAM 127 is used for decrypting and executing the cipher of an encrypted application 144 that the CPU 128 has read out from the flash memory 140 at the time of the application execution.

The flash memory 140 is an electrically batch-erasable/writable non-volatile memory. A flash memory chip, e.g., a large storage-capacity multi-value flash memory, can be considered as the memory 140. The flash memory 140 includes a user-access-prohibited area 142 where a user access is prohibited or limited, and a user-access-permitted area 141. Data stored into the user-access-prohibited area 142 is erased and written-in only by the CPU 128 inside the tamper-resistant module 121. Information that will cause a trouble if manipulated by the user, e.g., the encrypted application 144 executed by the CPU 128 and important information 143 such as firmware of the storage device 120, are saved into the user-access-prohibited area 142. Incidentally, in some cases, an electronic signature is added to the data here so that the tampering is impossible from the outside. The user-access-permitted area 141 is an area that is freely accessible from an external device connected to the storage device 120. Data that will present no problem if seen from the outside, e.g., a content 402, the encrypted programs, and the others, are saved into the user-access-permitted area 141. The firmware refers to hardware-converted software (i.e., program). Concretely, the firmware refers to BIOS, a driver, or the like.

The large variety types of application programs that the CPU 128 uses are in advance encrypted and stored into the flash memory 140. The encrypted application program 144, before being used, is supplied to the tamper-resistant module 121. At that time, the CPU 128 decrypts the application program with the use of KM 151 and the KM-compliant encryption processing program 152, then loading the decrypted program onto an application RAM 127. When the loading is completed, the application program becomes executable. Meanwhile, the content 402 such as a voice and an image are stored into the flash memory 140. At this time, the CPU 128 automatically analyzes storing destinations of the data in accordance with the access command 110. The details of the analyzing method will be explained later.

Figure 2:
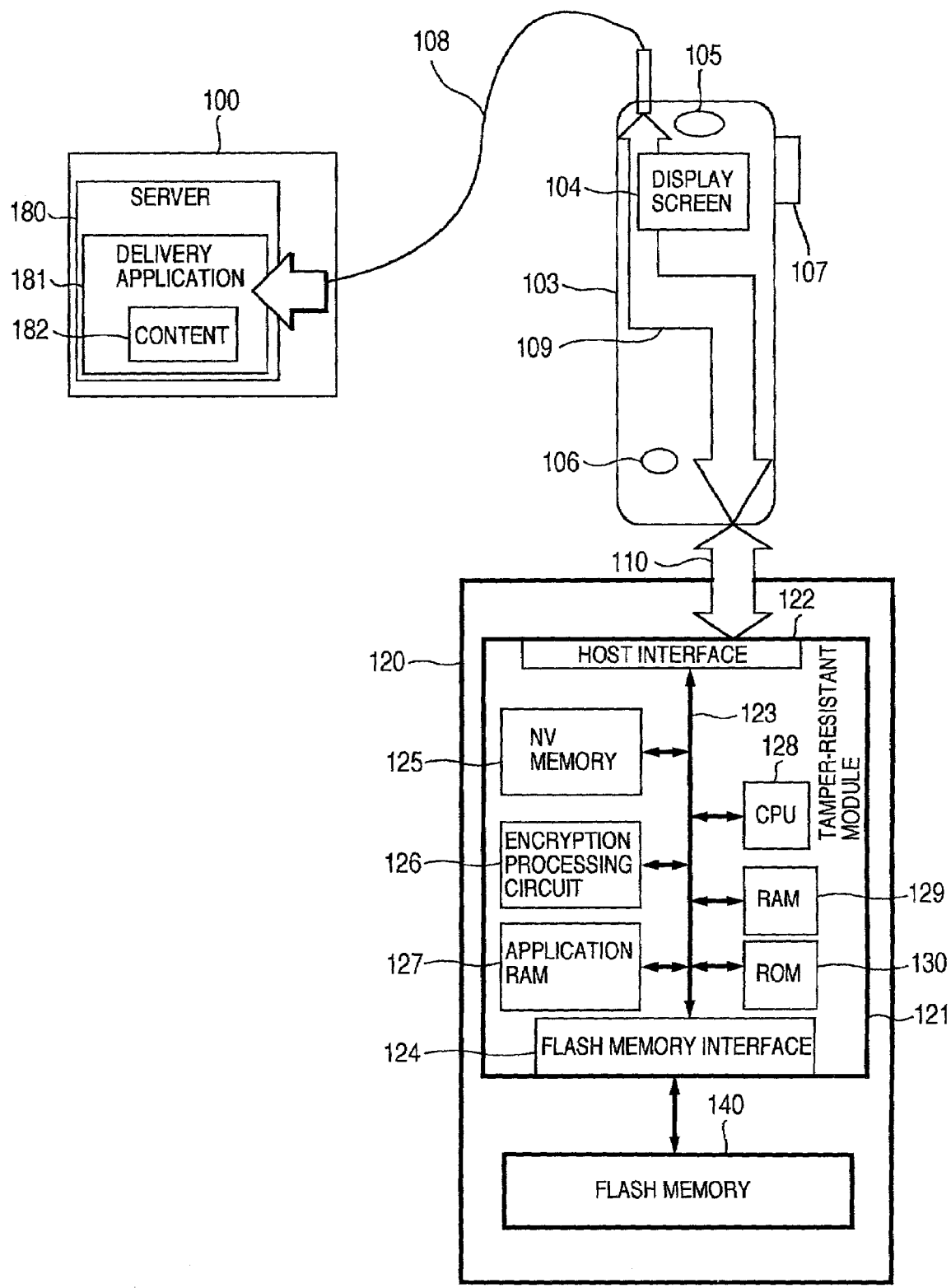
FIG. 2 is a diagram for illustrating the configuration of a system that utilizes the storage device to which the present invention has been applied.

FIG. 2 is a configuration diagram of a system that utilizes the embodiment of the storage device 120 to which the present invention has been applied.

The mobile terminal 103, which is connected to the storage device 120, has a function of performing communications with the service provider 100 with the utilization of the storage device 120. The mobile terminal 103 includes a display screen 104, a speaker 105, a microphone 106, and a CCD camera 107.

The service provider 100 has the server 180 for performing content delivery or the like toward the storage device 120. The server 180 includes the delivery application 181 and a content 182 to be delivered.

Between the service provider 100 and the mobile terminal 103, in order to prevent the leakage of the data, it is possible to establish the encrypted communications-path on the public line 108. Moreover, the storage device 120 connected to the mobile terminal 103 can further establish the encrypted inside-communications-path 109 inside the encrypted communications-path established with the service provider 100. Although, in the drawing, the inside-communications-path 109 is illustrated on the mobile terminal 103 alone, actually, the path 109 is installed on the public line 108 as well. The details will be explained later.

In the present system employing the service provider 100, the mobile terminal 103, and the storage device 120, when the service provider 100 and the storage device 120 transmit/receive the data therebetween, the data are encrypted two-fold between the service provider 100 and the mobile terminal 103, i.e., on the public line 108, whereas the data are encrypted one fold between the mobile terminal 103 and the storage device 120. In some cases, depending on an encryption processing method utilized by the mobile terminal 103 or the like, the data are encrypted (N+M)-fold between the service provider 100 and the mobile terminal 103, whereas the data are encrypted M-fold between the mobile terminal 103 and the storage device 120. Additionally, the appliance to which the storage device 120 is to be connected is not limited to the mobile terminal 103, and the public line 108 may be either a wired line or a wireless line. An optical cable or the like can be considered as the wired line.

Figure 3:
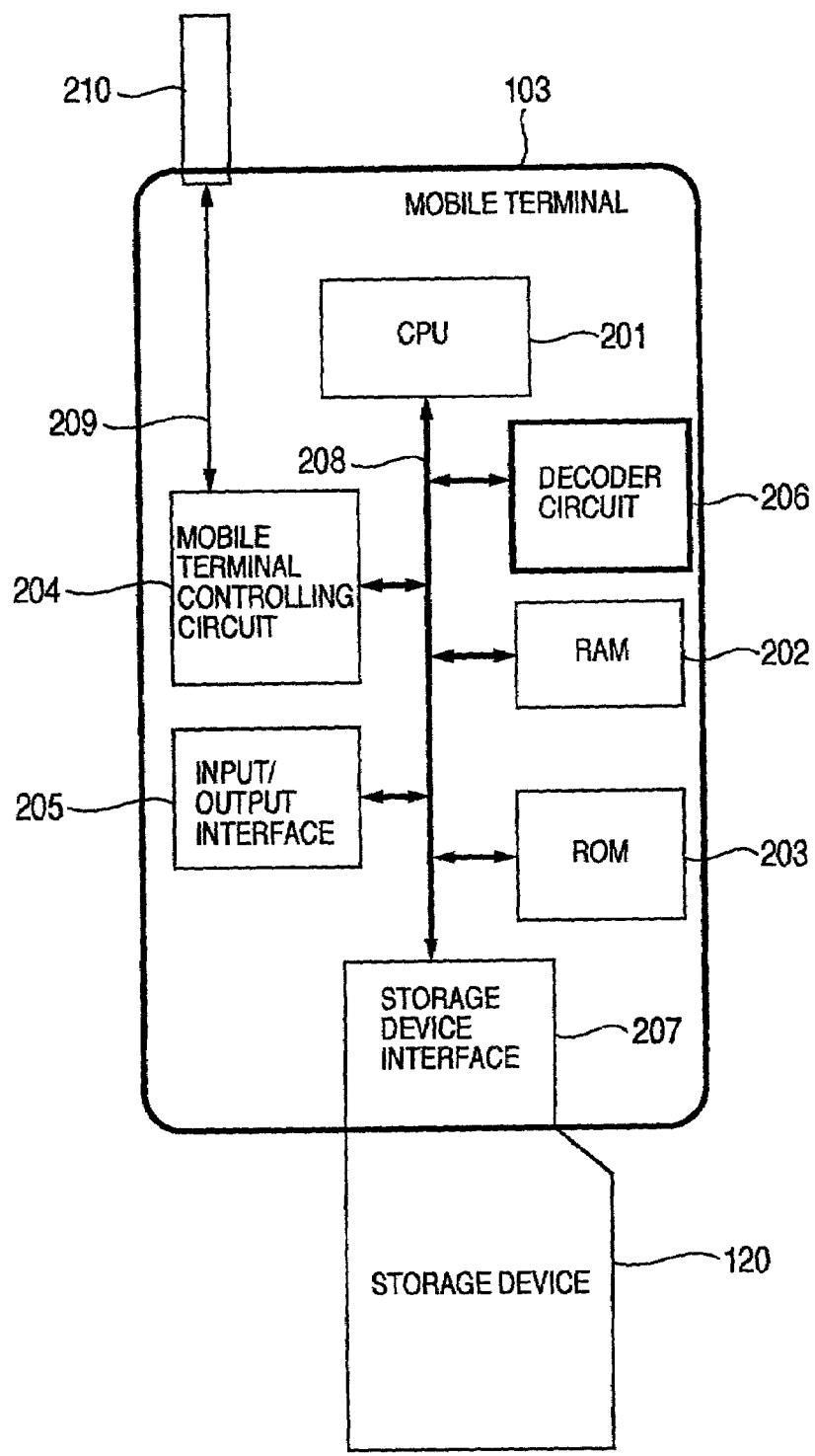
FIG. 3 is a configuration diagram of a mobile terminal connected to the storage device to which the present invention has been applied.

FIG. 3 is a configuration diagram of the mobile terminal 103.

A CPU 201 controls the respective circuits in the mobile terminal 103. A RAM 202 temporarily stores data that the CPU 201 utilizes. A ROM 203 records non-rewritable data that the CPU 201 permanently utilizes. A mobile terminal controlling circuit 204 performs a processing such as the transmission/reception of information between the mobile terminal 103 and the external appliance. An input/output interface 205 performs processings such as a key inputting by the user of the mobile terminal 103 and a screen displaying. A storage device interface 207 performs the transmission/reception of the information between the mobile terminal 103 and the storage device 120. A decoder circuit 206 decodes the information read out from the storage device 120 back to a voice, an image, and the like. A bus 208 is used for the transmission/reception of the information among the circuits.

Figure 4:
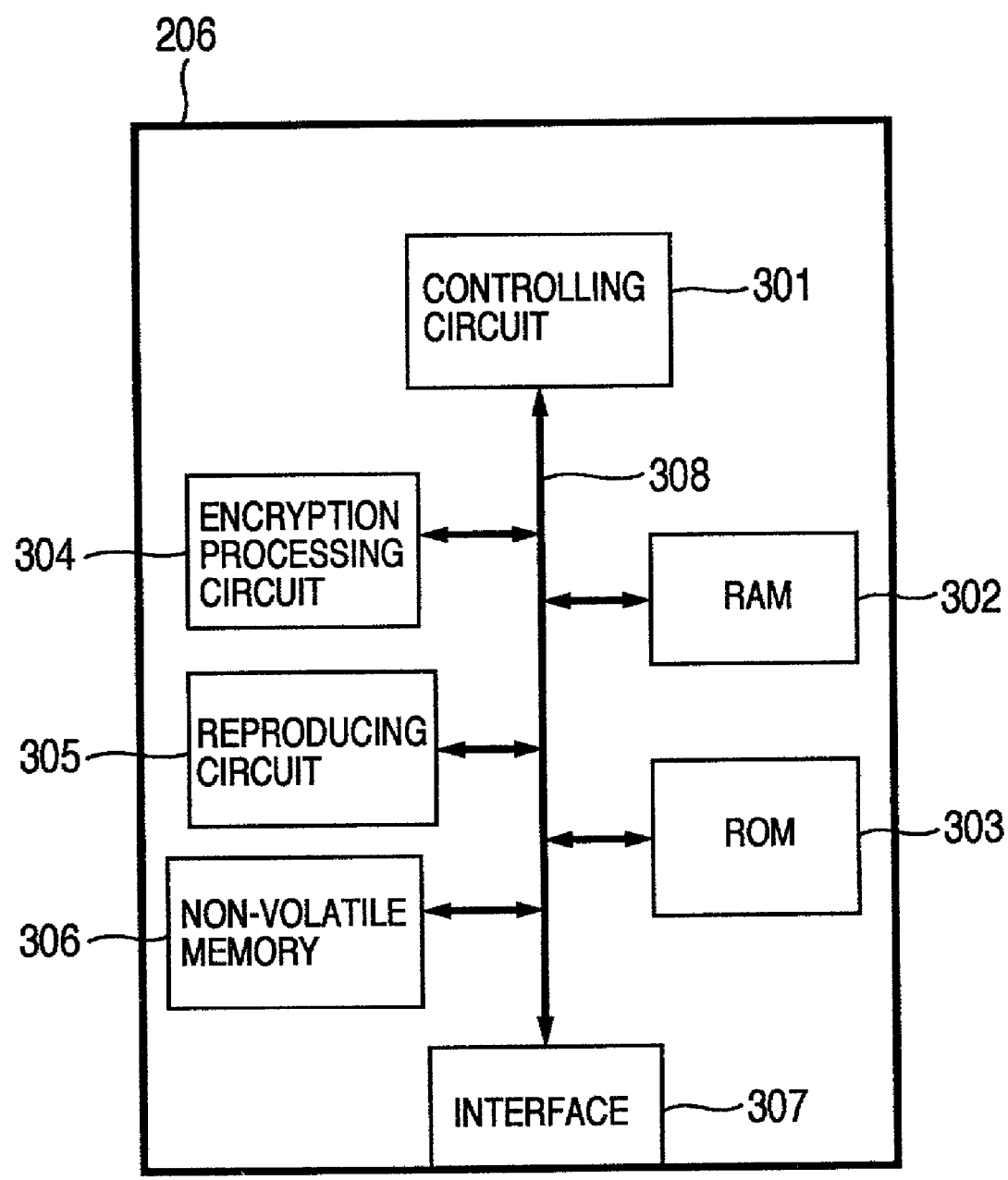
FIG. 4 is a configuration diagram of a decoder circuit mounted on the mobile terminal.

FIG. 4 is a diagram for illustrating the configuration of the decoder circuit 206.

The decoder circuit 206 decodes the data read out from the storage device 120, then reproducing the decoded data. Accordingly, it is required to prevent the decoded data from being accessed from the outside. On account of this, the decoder circuit 206 is configured as the tamper-resistant module. A controlling circuit 301 controls the respective circuits in the decoder circuit 206. A RAM 302 temporarily records the decoded information or the like. A ROM 303 records low-security information that is permanently utilized, such as programs of the controlling circuit. A non-volatile memory 306 records high-security information, such as a certificate of the decoder circuit 206 and a key needed to decrypt the encrypted data fetched from the storage device 120. An interface 307 is an interface used for establishing the connection with the external circuits. A bus 308 is used for the transmission/reception of the information among the respective circuits.

Figure 5:
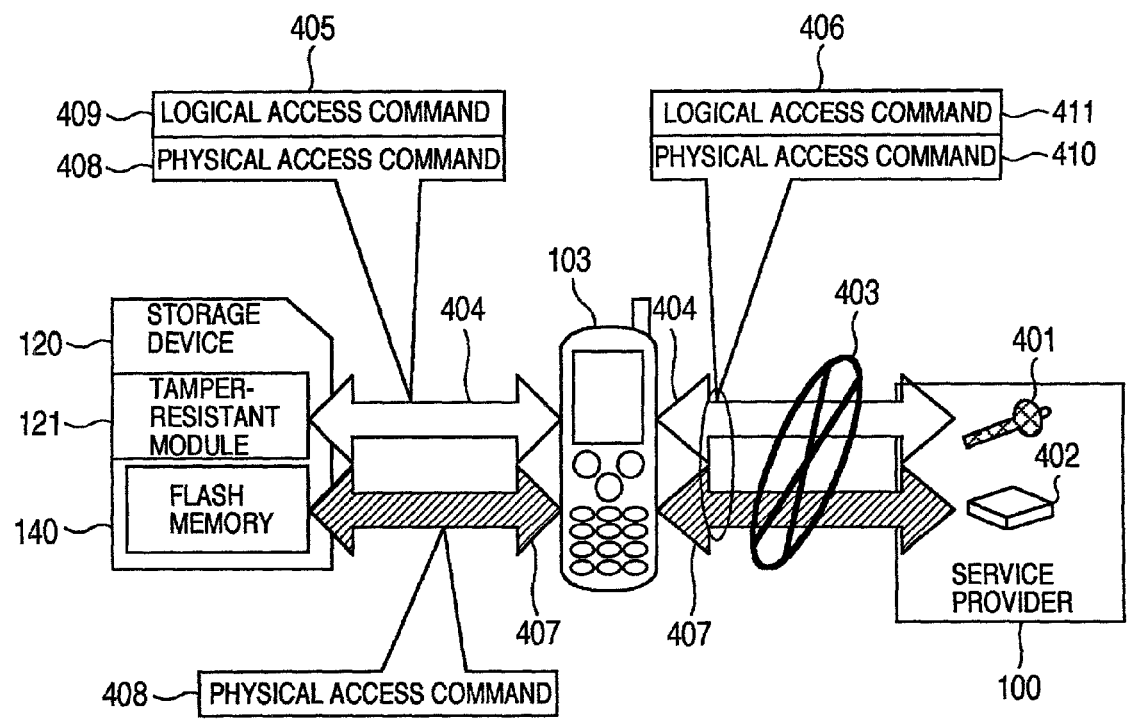
FIG. 5 is a diagram for illustrating a command system among the storage device, the mobile terminal, and a server.

FIG. 5 is a diagram for illustrating one example of the communications scheme in a system that employs the storage device 120 to which the present invention has been applied.

The transmission/reception of the information between the storage device 120 and the mobile terminal 103 is performed by the access command 110. The access command 110 is defined as a hierarchical access command (hereinafter, referred to as "a hierarchical command") 405. A physical access command 408 is a basic command on an input/output of data or the like with the storage device 120. A logical access command 409 is transmitted/received as the data for the physical access command 408. The storage device 120 and the mobile terminal 103 analyze the physical access command 408 and fetch the logical access command 409 from the data area, then executing the logical access command. The employment of the command configuration like this allows the commands to be easily extended without modifying the basic command between the mobile terminal 103 and the storage device 120.

A license 401 is information including a key for decrypting an encrypted content 402. The encrypted content 402 is a content encrypted by the license 401. The arrow attached to a license delivery 404 indicates the case where the license 401 is delivered from the service provider 100 to the tamper-resistant module 121 inside the storage device 120 via a network 403 and the mobile terminal 103. The arrow attached to a content delivery 407 indicates the case where the content 402 is delivered from the service provider 100 to the storage device 120. Between the service provider 100 and the mobile terminal 103, the license 401 and the content 402 are delivered using a hierarchical command 406. Between the mobile terminal 103 and the storage device 120, the license 401 is delivered using the hierarchical command 405, then being stored into the tamper-resistant module 121. Between the mobile terminal 103 and the storage device 120, using only the physical access command 408, the content 402 is delivered into the flash memory 140 inside the storage device 120.

FIGS. 19A to 19D are diagrams for illustrating configuration examples of the physical access command 408 and the logical access command 409.

The physical access command 408 includes the command code 1801, the length 1802, and the data area 1803. The command code 1801 includes the command type 1810, the attribute 1811, and the security level 1812. The command type 1810 and the attribute 1811 store information maintained in correspondence relationships shown by a table in FIG. 19C. The attribute 1811 refers to tags or the like indicating whether the data are, e.g., the personal information, the key information, and the like, or the other general information. Hereinafter, the data representing the attribute like this are referred to as "attribute data". The security level 1812 stores information indicating the level of the security of data transmitted by a command. In the present embodiment, the security level is classified into three stages. A device that issues the access command 110, in correspondence with the property of the data to be transmitted, adds the security level onto the access command 110 at the time of the issuing.

The length 1802 stores information indicating the length of the data area 1803. In addition to the usual data, the data area 1803 stores the logical access command 409 as well.

The logical access command 409 includes the command code 1804, the length 1805, and the data 1806. The command code 1804 is the same as the command code 1801 of the physical access command 408. The length 1805 stores information indicating the length of data to be stored into the data 1806. The data 1806 stores the real data.

The hierarchical command 406 and a physical access command 410 and a logical access command 411 which constitute the hierarchical command 406 are basically of the same configuration as that of the hierarchical command 405. The hierarchical command 406 is used when the mobile terminal 103 and the server 180 transmit/receive the information via the network 403. Incidentally, it does not matter at all if the hierarchical command 405 and the hierarchical command 406 differ from each other in their concrete command codes or the like.

Figure 20:
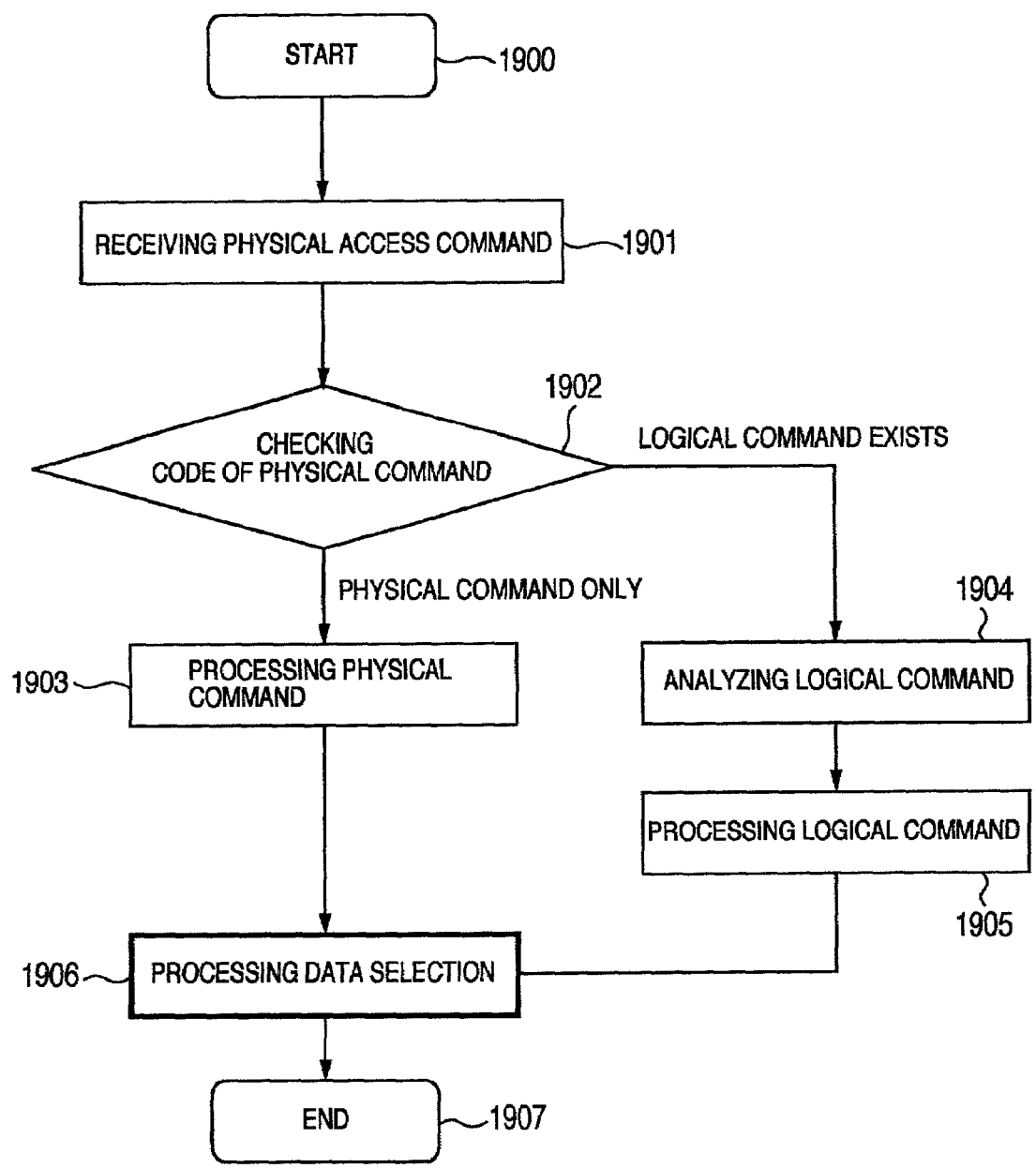
FIG. 20 is a flow diagram for explaining the flow of a command analysis in the storage device.

FIG. 20 is a flow diagram for explaining a dividing processing of the hierarchical command, where the hierarchical command is received and divided by the storage device 120.

The storage device 120 receives the physical access command 408 (1901). The CPU 128 in the storage device 120 checks the command code 1801 of the physical access command 408 (1902). If the logical access command 409 exists therein, the CPU 128 executes the analysis of the logical access command (1904). The CPU 128 processes the logical access command 409 (1905). If the logical access command 409 is not included in the physical access command 408, the CPU 128 executes the processing of the physical access command (1903). When the command processing has been terminated, the CPU 128 performs a data selection processing so as to differentiate high-security data from low-security data, then recording the respective data into areas that are appropriate thereto each (1906).

Figure 21:
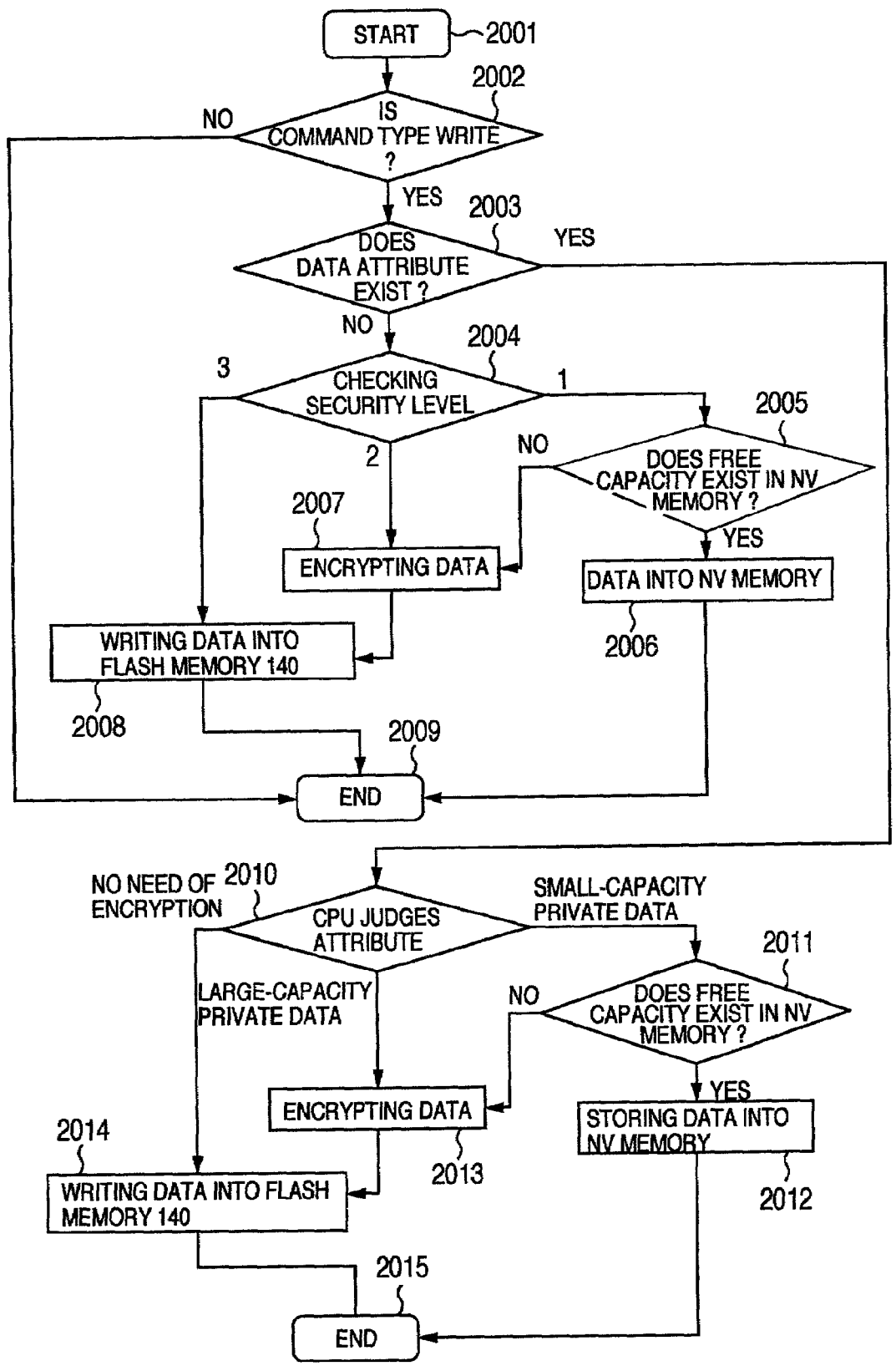
FIG. 21 is a flow diagram for explaining the steps of a data selecting processing in the storage device.

FIG. 21 is a flow diagram for explaining the data selection processing 1906 that the CPU 128 executes.

The CPU 128 checks whether or not the command type 1810 of the physical access command 408 or the logical access command 409 transmitted from the mobile terminal 103 is of a WRITE command (2002). If the command type is of a command other than the WRITE command, the CPU terminates the processing (2009). If the command type 1810 is of the WRITE command, the CPU 128 checks the data within the data area, thereby checking whether or not there exists the attribute data in the attribute 1811 (2003). If there exists no attribute data in the attribute 1811, the CPU 128 checks the security level 1812 in the command code (2004). If the security level is equal to 1, the CPU 128 checks the free available capacity of the NV memory 125 (2005), and if there exists enough free capacity, the CPU stores the data into the NV memory 125 (2006). If there exists no enough free capacity, the CPU 128 encrypts the data (2007), then writing the encrypted data into the flash memory 140 (2008). If the security level is equal to 2, the CPU 128 encrypts the data (2007), then writing the encrypted data into the flash memory 140 (2008). If the security level is equal to 3, the CPU 128 writes the data into the flash memory 140 (2008). If, at the step 2003, the CPU 128 has judged that there exists the attribute data in the attribute 1811, the CPU 128 judges the content of the attribute data (2010). If, based on the attribute data, the data transmitted by the access command is judged to be small-capacity private data, the CPU 128 checks the free capacity of the NV memory 125 (2011). Then, if there exists enough free capacity, the CPU stores the data into the NV memory 125 (2012). If there exists no enough free capacity, the CPU 128 encrypts the data (2013), then writing the encrypted data into the flash memory 140 (2014). If the data is judged to be large-capacity private data, the CPU 128 encrypts the data (2013), then storing the encrypted data into the flash memory 140 (2014). If there is no need of the encryption, the CPU 128 writes the data as it is into the flash memory 140 (2014).

Figure 6:
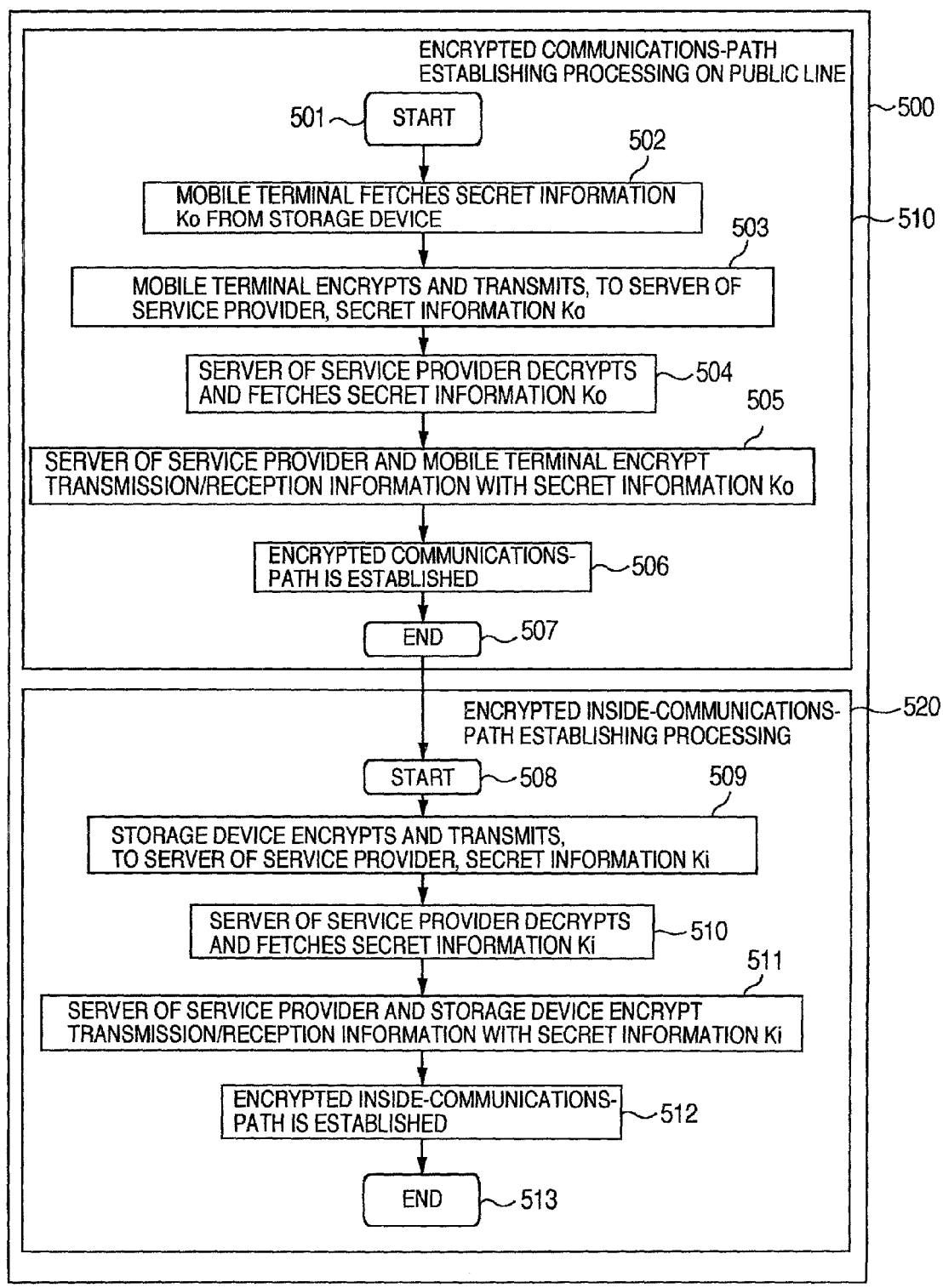
FIG. 6 is a flow diagram for explaining an encrypted communications-path establishing processing.

FIG. 6 is a flow diagram for explaining an encrypted communications-path establishing processing 510 and an encrypted inside-communications-path establishing processing 520 on the public line 108. Being summarized as one processing, these steps are referred to as "an encrypted communications-path establishing processing 500".

The explanation will be given below concerning the encrypted communications-path establishing processing 510 on the public line 108. The mobile terminal 103 fetches the secret information KO 153 from the storage device 120 (502). The mobile terminal 103 encrypts the secret information KO 153, then transmitting the encrypted secret information to the service provider 100 (503). The server 180 of the service provider 100, which has received the encrypted secret information KO 153, decrypts and fetches the secret information KO 153 (504). In the communications thereinafter, the server 180 and the mobile terminal 103 encrypt information by using the secret information KO 153, then transmitting/receiving the encrypted information therebetween (505). This allows the encrypted communications-path to be established (506).

The explanation will be given below regarding the encrypted inside-communications-path establishing processing 520. The storage device 120 encrypts the secret information KI 155, then transmitting the encrypted secret information KI 155 to the service provider 100 by using the encrypted communications-path that has been established between the mobile terminal 103 and the service provider 100 (509). The server 180 of the service provider 100, which has received the encrypted secret information KI 155, decrypts and fetches the secret information KI 155 (510). Thereinafter, the server 180 and the storage device 120 encrypt information by using the secret information KI 155, then transmitting/receiving the encrypted information therebetween (511). This allows the encrypted inside-communications-path to be established (512).

Figure 7:
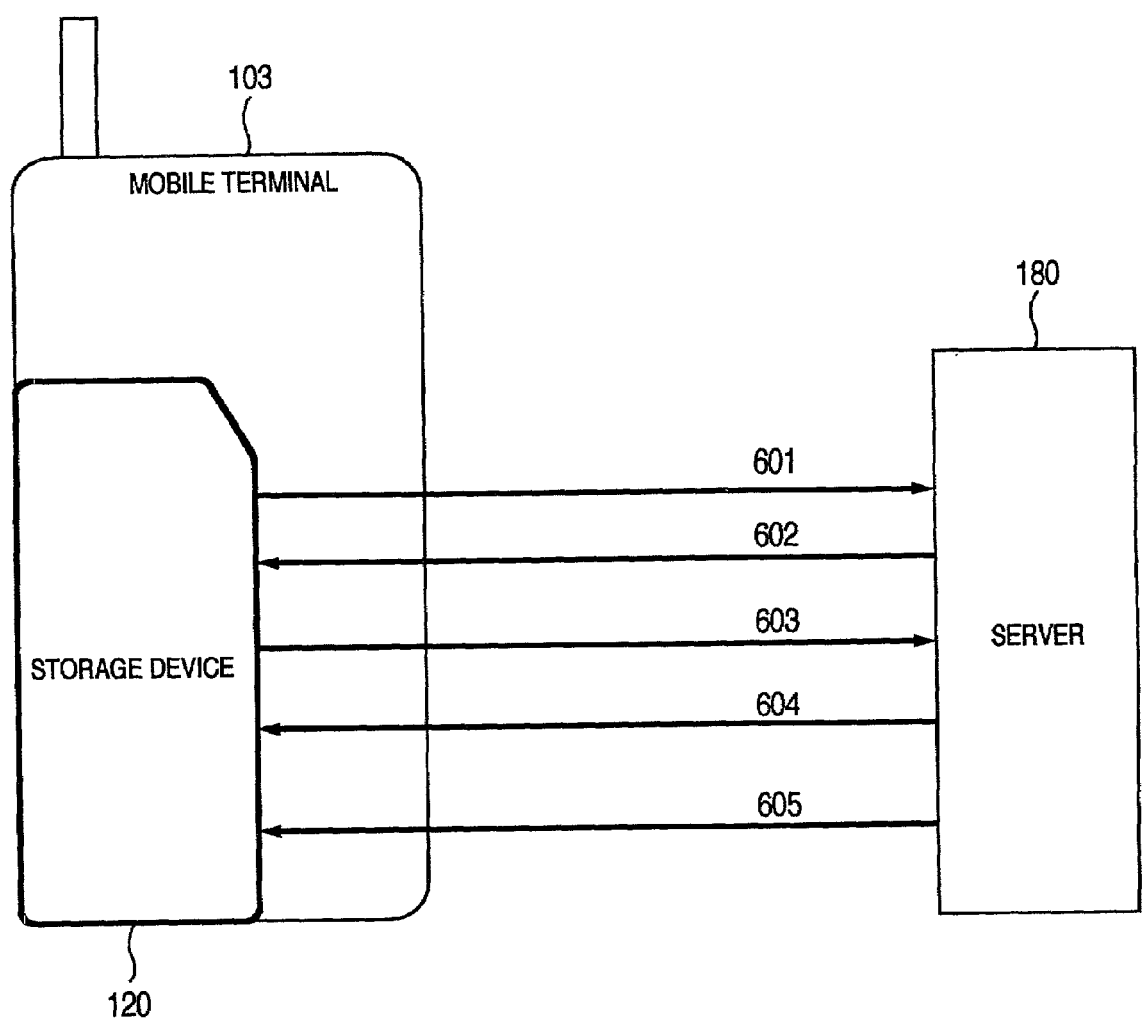
FIG. 7 is a flow diagram for explaining the processing steps where the storage device connected to the mobile terminal acquires a content and a license from the server.

FIG. 7 is a diagram for explaining the basic flow of a copyright protection among the mobile terminal 103, the storage device 120, and the server 180. This drawing illustrates the case where the content 402 whose copyright wishes to be protected is transmitted from the server 180 to the storage device 120. The notation of the respective transmitting steps follows a table notation definition 2101 illustrated in FIG. 22. Incidentally, in FIG. 7, the server 180 generates KS1, using a random number or the like. The encryption processing circuit 126 in the storage device 120 generates KS2, using a random number or the like.

If the user operates the mobile terminal 103 to instruct the storage device 120 to perform the content acquisition, the storage device 120, via the mobile terminal 103, issues a content request 601 to the server 180 that holds the content 402. In accompaniment with this content request, the storage device 120 transmits, to the server 180, a CONTENT ID corresponding to the content 402 to be acquired and a certificate C (KA, KPMC | | IMC) for certifying that the storage device 120 is an authentic appliance (601). Having received the CONTENT ID and the certificate C, the server 180 checks the certificate. If the certificate is an authorized one, the server transmits a session key E (KPMC, KS1) to the storage device 120 (602). Having received the session key KS1, the storage device 120 transmits, to the server 180, various information including a session key KS2 as E (KS1, KPM1 | | KS2 | | CRLUPDATE) (603). Having received the various information, the server 180 transmits, to the storage device 120, various information including the license 401 as E (KS2, CRL | | E (KPM1, TRANSACTION ID | | ACM KC | | ACP) (604). Subsequently, the server 180 transmits, to the storage device 120, the content 402 as E (KC, CONTENT) (605). The transmission/reception of information that will be explained hereinafter is performed using the scheme described here.

Figure 8:
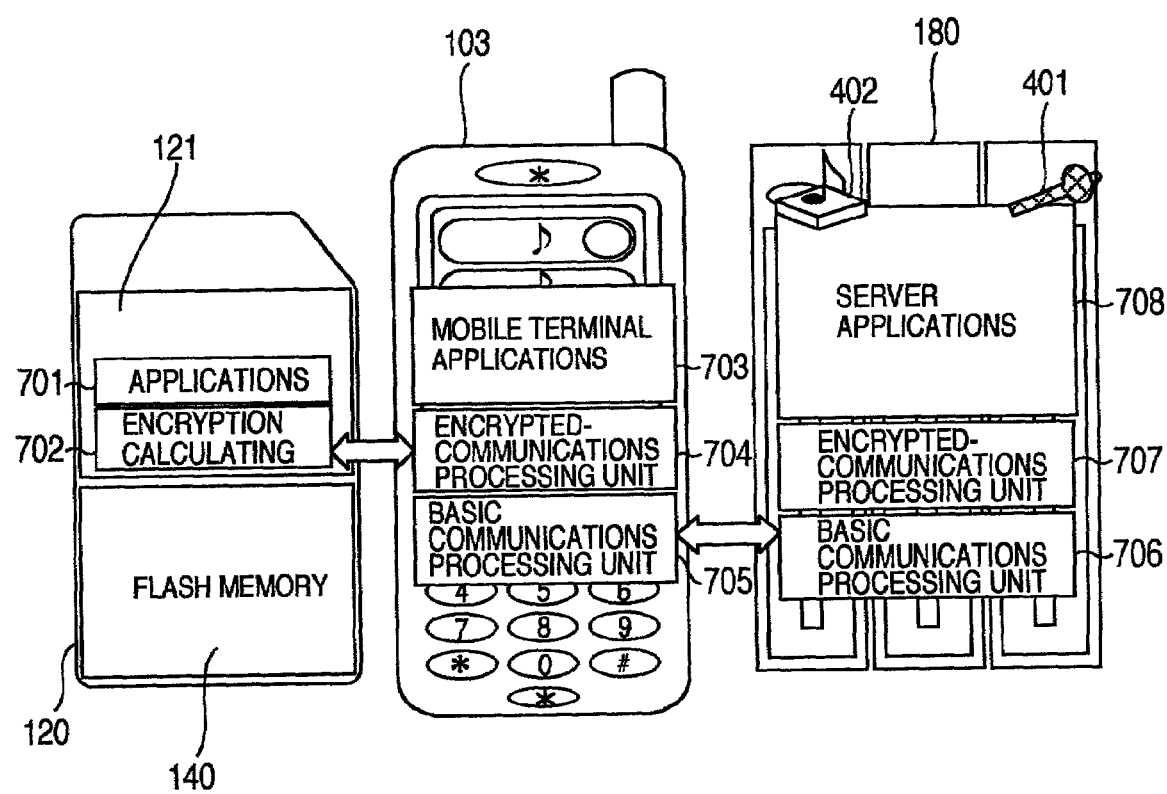
FIG. 8 is a diagram for illustrating the software configurations of the respective appliances to which the present invention has been applied.

FIG. 8 illustrates the hierarchical configurations of the respective software programs of the storage device 120, the mobile terminal 103, and the server 180. In the following description, the description of the service provider 100 will be omitted. In the storage device 120, applications 701 are configured on an encryption calculating unit 702. The applications 701 perform the encryption processing or the like, using the encryption calculating unit 702. The software is configured in the tamper-resistant module 121. As the applications 701, there are mounted the applications 701 that meet the services offered by the storage device 120, i.e., the services ranging from the data processings inside the storage device 120 to the encrypted communications. The encryption calculating unit 702 performs calculation processings about the ciphers. The encryption calculating unit 702 is utilized not only by the applications 701 but also by an encrypted-communications processing unit 704 in the mobile terminal 103.

In the mobile terminal 103, the encrypted-communications processing unit 704 is configured on a basic communications processing unit 705 and further, mobile terminal applications 703 are configured on the processing unit 704. The basic communications processing unit 705 performs basic processings concerning the communications by the mobile terminal 103, e.g., the communications-path encoding, the modification of the communications rate, and the data transmission/reception. The encrypted-communications processing unit 704 performs the encryption processings of the transmitted/received data, using an encrypting scheme determined beforehand between the processing unit 704 and the server 180. The preparation for the data needed for the encrypted communications and the processings such as the encrypting calculations are performed using the encryption calculating unit 702 in the storage device 120. The mobile terminal applications 703 are various types of applications that the user utilizes with the mobile terminal 103, e.g., the menu display and the electronic mail function. In the server 180, the software includes a basic communications processing unit 706, an encrypted-communications processing unit 707, and server applications 708. The basic communications processing unit 706 and the encrypted-communications processing unit 707 basically perform the same operations as those of the encrypted-communications processing unit 704 and the basic communications processing unit 705 in the mobile terminal 103. The encrypted-communications processing unit 707, however, may not utilize the storage device 120 when performing the processings about the encryption. The server applications 708 are applications needed in order to function as the server, e.g., the management of the content 402 to be delivered to the mobile terminal 103 and the management of the user.

Figure 9:
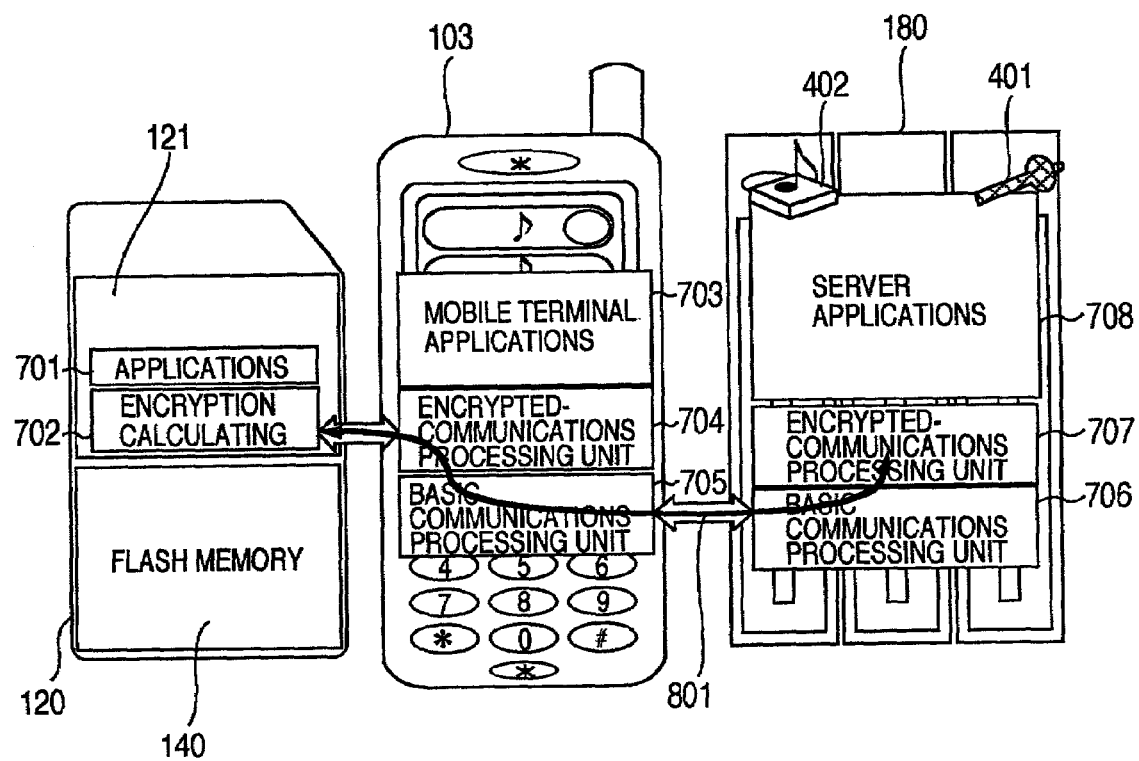
FIG. 9 is a diagram for illustrating the establishment of the encrypted communications-path in the present invention.

The explanation will be given below concerning the case where the storage device 120 acquires the content 402 from the server 180 via the mobile terminal 103. As illustrated in FIG. 9, the encrypted-communications processing unit 704 in the mobile terminal 103 and the encrypted-communications processing unit 707 in the server 180 configure an encrypted communications-path 801 (this is equivalent to the encrypted inside-communications-path 109) via the basic communications processing units 705, 706. The encrypted-communications processing unit 704 utilizes the encryption calculating unit 702 inside the storage device 120 so as to perform the calculations about the encryption. At the same time, the processing unit 704 transmits the information on the user to the server 180, thereby recording temporary key information or the like that is used for the encryption/decryption in the encrypted communications-path 801.

Figure 10:
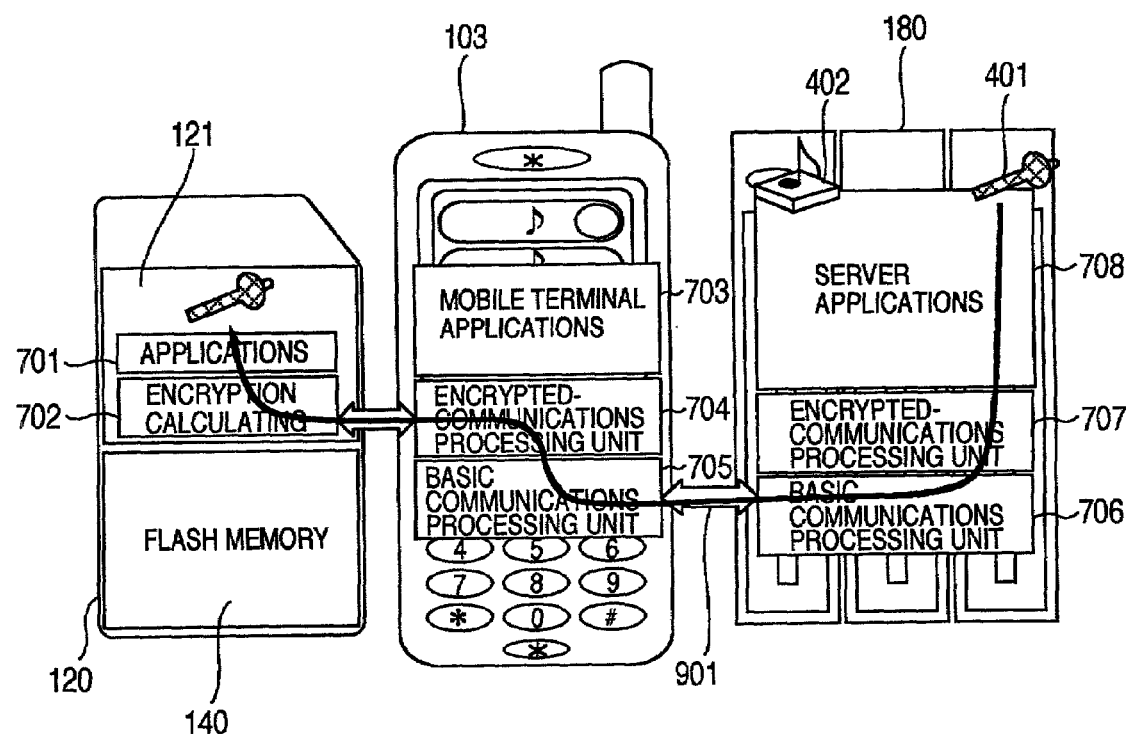
FIG. 10 is a diagram for illustrating the migration of the license in the present invention.

When an encrypted communications-path 901 is configured, as illustrated in FIG. 10, the respective applications of the storage device 120, the mobile terminal 103, and the server 180 are started up. The applications 701 in the storage device 120 acquire, via the mobile terminal 103 and the encrypted communications-path 901, the license 401 corresponding to the content 402 wished to be acquired from the server applications 708, then storing the license 401 into the tamper-resistant module 121 in the storage device 120.

Figure 11:
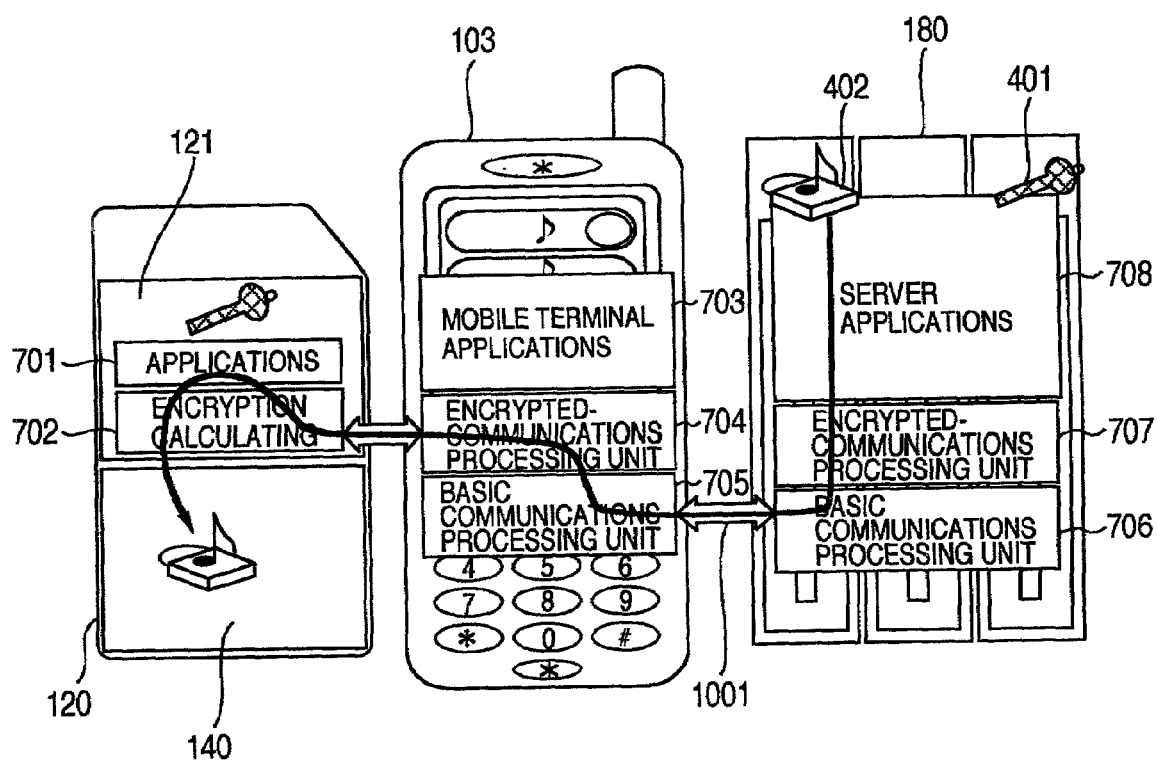
FIG. 11 is a diagram for illustrating the migration of the content in the present invention.

When the acquisition of the license has been terminated, as illustrated in FIG. 11, the applications 701 in the storage device 120 acquire the encrypted content 402 from the server applications 708 via the mobile terminal 103 and the encrypted communications-path 1001, then storing the encrypted content into the flash memory 140 inside the storage device 120. Additionally, since the content 402 has been already encrypted, at this step, it is well enough to simply store, into the storage device 120, the data received from the server 180. Consequently, the processing is performed using only the physical access command 408. Using the logical access command 409 is also allowable.

Figure 12:
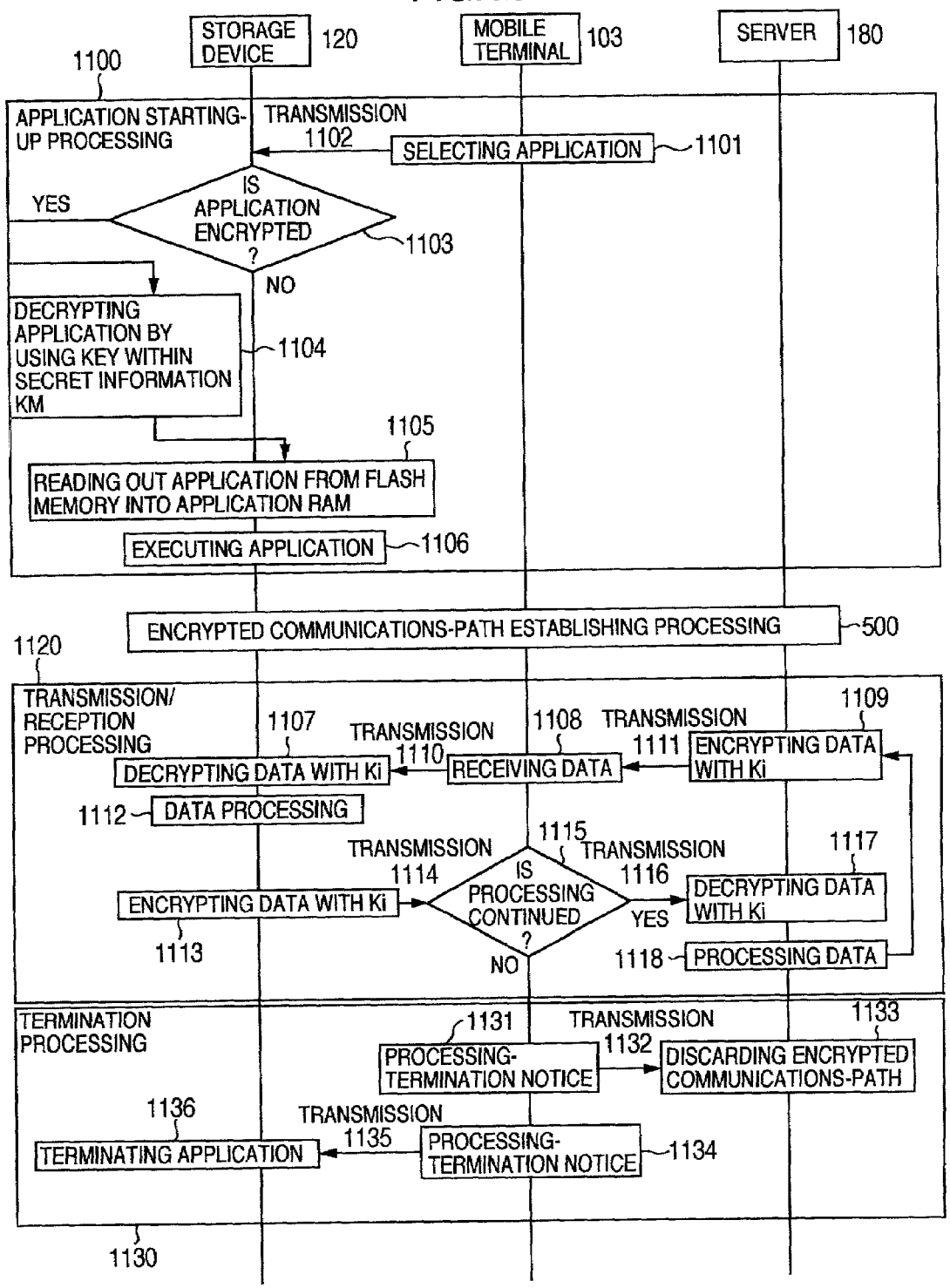
FIG. 12 is a flow diagram for explaining the processing steps at the time of a download in the present invention.

FIG. 12 is a flow diagram for explaining the processing steps of the communications in FIGS. 8 to 11.

An application starting-up processing is executed (1100). The mobile terminal 103 selects, from inside the storage device 120, an application for performing a processing needed for communications to be performed by the mobile terminal 103 (1101). The CPU 128 checks whether or not the application, which is selected by the mobile terminal 103 and stored into the flash memory 140, has been encrypted (1103). In the case of having been encrypted, the CPU 128 decrypts the application with the use of the secret information KM 151, then storing the application into the application RAM 127 (1104). In the case of having been not encrypted, the CPU 128 reads out the application as it is from the flash memory 140, then storing the application into the application RAM 127 in a state where the application is executable (1105). Then, the CPU 128 executes the application (1106).

When the application is started up, the mobile terminal 103 and the storage device 120 execute the encrypted communications-path establishing processing 500, thereby establishing the communications-path with the server 180.

A transmission/reception processing 1120 is executed between the storage device 120 and the server 180. At this time, taking advantage of the secret information KI 155 used in the encrypted inside-communications-path establishing processing 520 of the encrypted communications-path establishing processing 500, the server 180 and the storage device 120 encrypt the data of each other, thus performing the transmission/reception via the mobile terminal 103 (1107 to 1118). The mobile terminal 103 is incapable of seeing the data that the storage device 120 is transmitting/receiving. Instead, the mobile terminal 103 is capable of differentiating only the data whose transmission termination has been indicated by the storage device 120. Accordingly, if the applicable data is transmitted from the storage device 120, the mobile terminal 103 terminates the transmission/reception processing 1120.

In order to terminate the transmission/reception processing 1120, the mobile terminal 103 executes a termination processing 1130. Concretely, the mobile terminal 103 transmits a processing-termination notice to the storage device 120 and the server 180 (1132, 1135). This causes the server 180 to discard the communications-path (1133), and causes the storage device 120 to terminate the application (1136).

Figure 13:
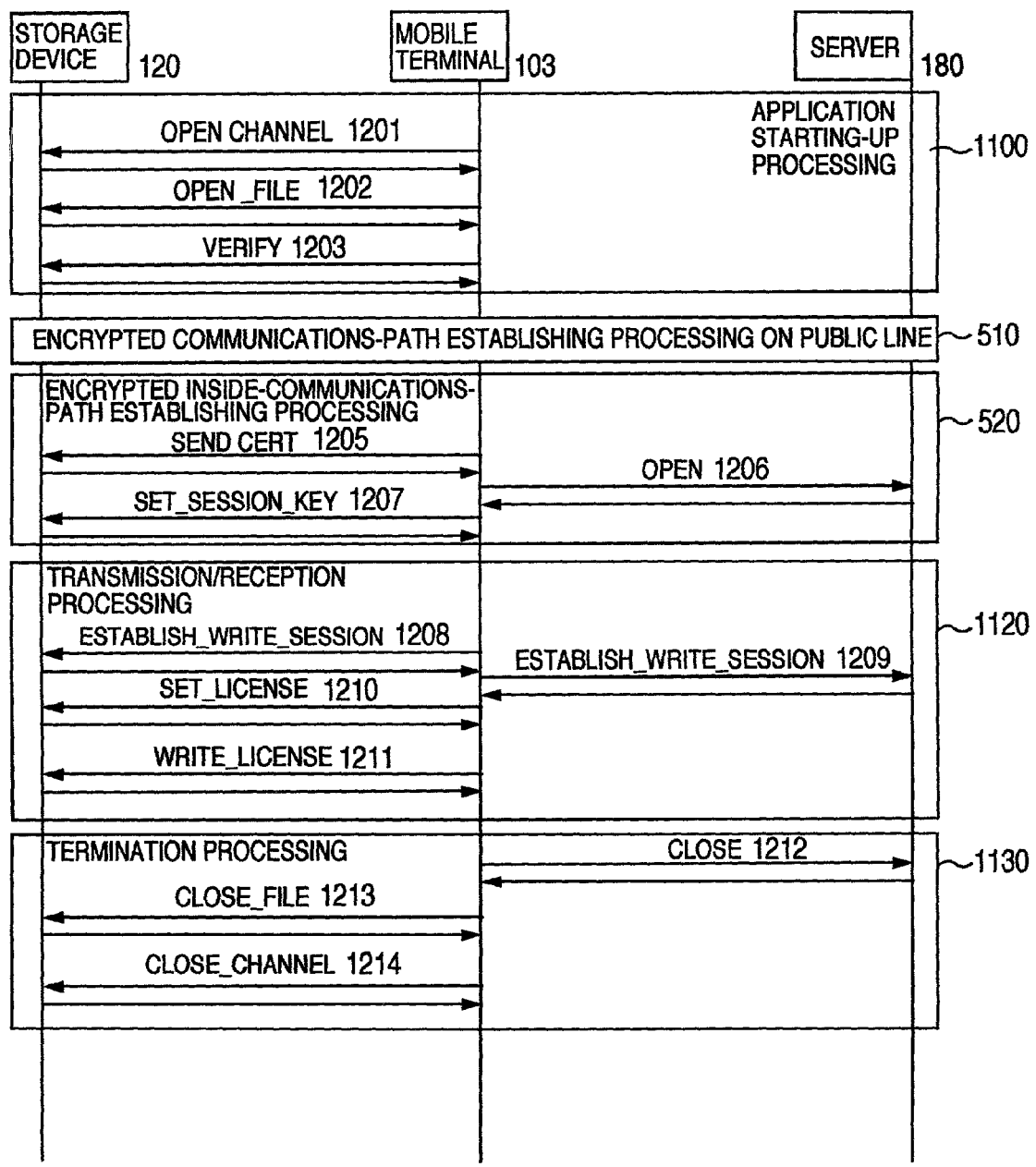
FIG. 13 is a flow diagram for explaining the command exchanges at the time of a license acquisition in the present invention.

FIG. 13 is a diagram for illustrating the exchanges of concrete commands in the case where the license 401 is downloaded from the server 180 into the storage device 120 via the mobile terminal 103. The explanation will be given below in a manner of corresponding to FIG. 12.

In the application starting-up processing 1100, the following commands are exchanged:

OPEN_CHANNEL 1201 is a command that the mobile terminal 103 issues to the storage device 120 in order to configure a virtual communications-path therebetween. The storage device 120 returns the number of the virtual communications-path. The communications hereinafter are performed using the virtual communications-path number.

OPEN_FILE 1202 is a command by which the mobile terminal 103 specifies a file in the storage device 120 for storing the license 401. The storage device 120 returns the allocation number of the specified file. The processings hereinafter are performed using this file allocation number. VERIFY 1203 is a command by which the mobile terminal 103 issues a certification code for starting up the applications inside the storage device 120. If the storage device 120 verifies that the certification code is an authorized one, the applications inside the storage device 120 are started up. This makes it possible to access the file specified by OPEN_FILE 1202.

The encrypted communications-path establishing processing 510 on the public line 108 is performed.

In the encrypted inside-communications-path establishing processing 520, the following commands are exchanged:

SEND_CERT 1205 is a command by which the mobile terminal 103 requests the storage device 120 to transmit the certificate for certifying that the storage device 120 is an authentic one. The storage device 120 transmits the certificate to the mobile terminal 103.

OPEN 1206 is a command by which the mobile terminal 103 transmits, to the server 180, the certificate and the CONTENT ID read out from the storage device 120. If the server 180 verifies the certificate, the server 180 generates the session key KS1, then transmitting KS1 to the mobile terminal 103.

SET_SESSION_KEY 1207 is a command by which the mobile terminal 103 transmits, to the storage device 120, the session key KS1 received from the server 180. Additionally, the commands, i.e., SEND_CERT 1205, OPEN 1206, and SET_SESSION_KEY 1207, correspond to the content request 601 and the session key KS1 transmission 602 in FIG. 7.

In the transmission/reception processing 1120, the following commands are exchanged:

ESTABLISH_WRITE_SESSION 1208 is a command by which the storage device 120 generates the session key KS2 and transmits, to the mobile terminal 103, KS2 that is encrypted using KS1.

ESTABLISH_WRITE_SESSION 1209 is a command by which the mobile terminal 103 transmits, to the server 180, KS2 that has been encrypted using KS1 received from the storage device 120. The server 180, after having received the encrypted KS2, decrypts the encrypted KS2 by using KS1 and encrypts the license 401 by using KS2, then transmitting the encrypted license 401 to the mobile terminal 103.

SET_LICENSE 1210 is a command by which the mobile terminal 103 transmits the license 401 to the storage device 120.

WRITE_LICENSE 1211 is a command that the mobile terminal 103 issues in order to cause the storage device 120 to perform the following: Decrypting the license 401 by using KS2, and creating a license-storing area in the NV memory 125 inside the tamper-resistant module 121 so as to store the decrypted license 401 into the license-storing area. Incidentally, ESTABLISH_WRITE_SESSION 1208, ESTABLISH_WRITE_SESSION 1209, SET_LICENSE 1210, and WRITE_LICENSE 1211 correspond to the session key KS2 transmission 603 and the license transmission 604 in FIG. 7.

In the termination processing 1130, the following commands are exchanged:

CLOSE 1212 is a command by which the mobile terminal 103 informs the server 180 of the termination of the license acquisition processing. Having received CLOSE 1212, the server 180 discards the encrypted communications-path 801 between the mobile terminal 103 and the server 180.

CLOSE_FILE 1213 is a command that the mobile terminal 103 issues in order to close the file in the storage device 120.

CLOSE_CHANNEL 1214 is a command that the mobile terminal 103 issues in order to terminate the processing by closing the virtual communications-path that has been utilized between the mobile terminal 103 and the storage device 120.

Figure 14:
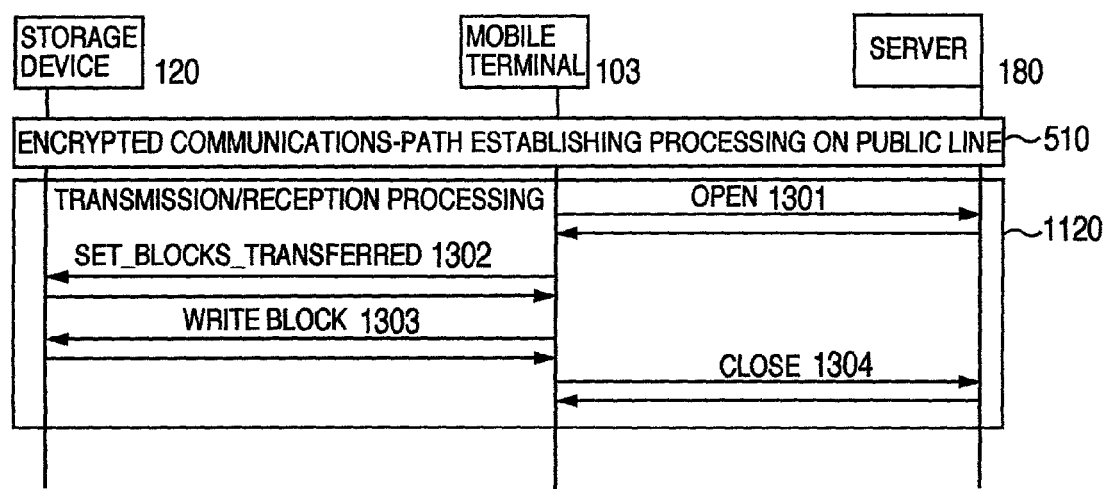
FIG. 14 is a flow diagram for explaining the command exchanges at the time of a content acquisition in the present invention.

FIG. 14 is a diagram for illustrating the exchanges of concrete commands in the case where the content 402 is downloaded from the server 180 into the storage device 120 via the mobile terminal 103. The explanation will be given below in a manner of corresponding to FIG. 11.

The encrypted communications-path establishing processing 510 on the public line 108 is performed.

In the transmission/reception processing 1120, the following commands are exchanged: OPEN 1301 is a command by which the mobile terminal 103 transmits, to the server 180, the CONTENT ID corresponding to the content 402 to be acquired. Having received the CONTENT ID, the server 180 transmits the encrypted content 402 to the mobile terminal 103.

SET_BLOCKS_TRANSFERRED 1302 is a command by which the mobile terminal 103 transmits, to the storage device 120, the size of the encrypted content 402 received from the server 180.

WRITE_BLOCK 1303 is a command by which the mobile terminal 103 allows the encrypted content 402 received from the server 180 to be transferred to an arbitrary address on the flash memory 140 inside the storage device 120. As the addressing method, there can be considered the following method or the like: A file system is provided on the flash memory 140, and a file corresponding to the encrypted content 402 is created based on the CONTENT ID, then addressing an address determined by the file system. There are some cases where, when the encrypted content 402 has a large-capacity, SET_BLOCKS_TRANSFERRED 1302 and WRITE_BLOCK 1303 are issued a plurality of times.

CLOSE 1304 is a command by which the mobile terminal 103 informs the server 180 of the termination of the license acquisition processing. Having received CLOSE 1304, the server 180 discards the encrypted communications-path between the mobile terminal 103 and the server 180. Incidentally, the steps in FIG. 14 correspond to the content transmission 605 in FIG. 7.

Figure 15:
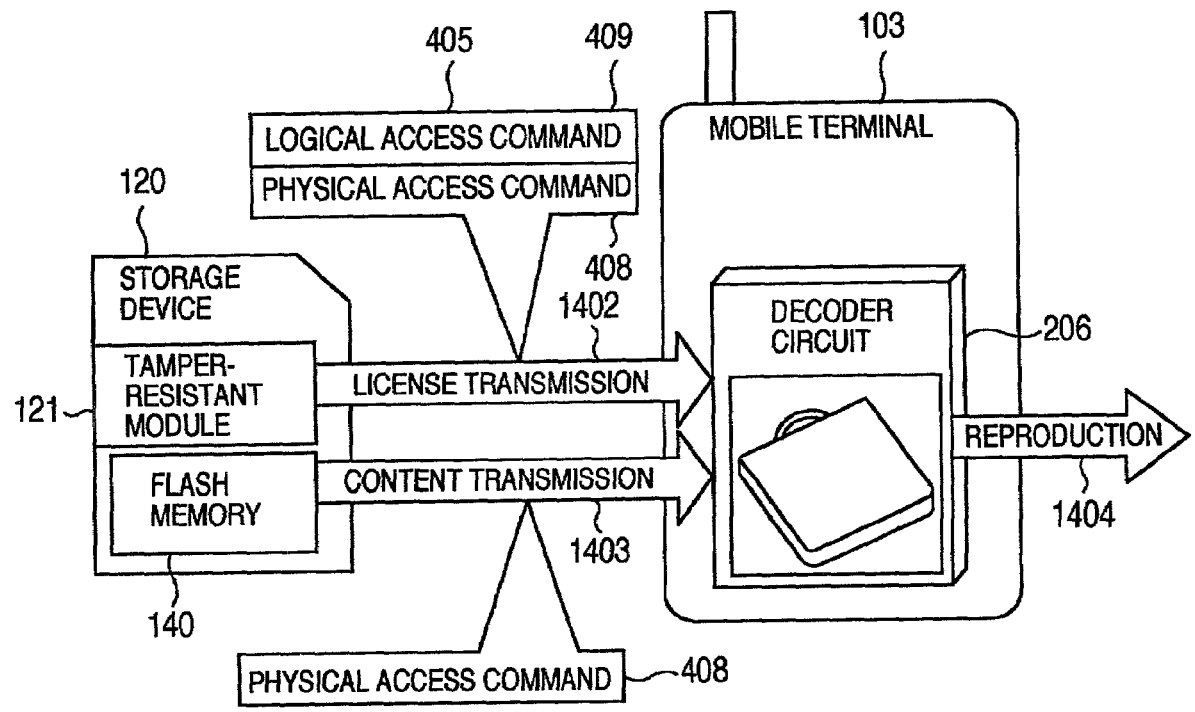
FIG. 15 is a diagram for illustrating the configuration of the appliances at the time of a content reproduction in the present invention.

FIG. 15 is a conceptual diagram in the case where the decoder circuit 206 inside the mobile terminal 103 reproduces the encrypted content 402 inside the storage device 120. The decoder circuit 206 can also be used in a state of being mounted on an appliance other than the mobile terminal 103. The storage device 120 can also be connected to an appliance other than the mobile terminal 103. As the concrete examples, there can be considered an MP3 player, a stereo, and a digital image reproducer. Out of the tamper-resistant module 121 in the storage device 120, the decoder circuit 206 fetches the license 401 corresponding to the encrypted content 402 that is wished to be reproduced. The decoder circuit 206 fetches the encrypted content 402 out of the flash memory 140 so as to decrypt the encrypted content 402 using the license 401, then reproducing the content 402. A license transmission 1402 is performed using the hierarchical command 405. A content transmission 1403 is performed using the physical access command 408. Incidentally, this is not the case concerning the respective command configurations at the times of the transmissions.

Figure 16:
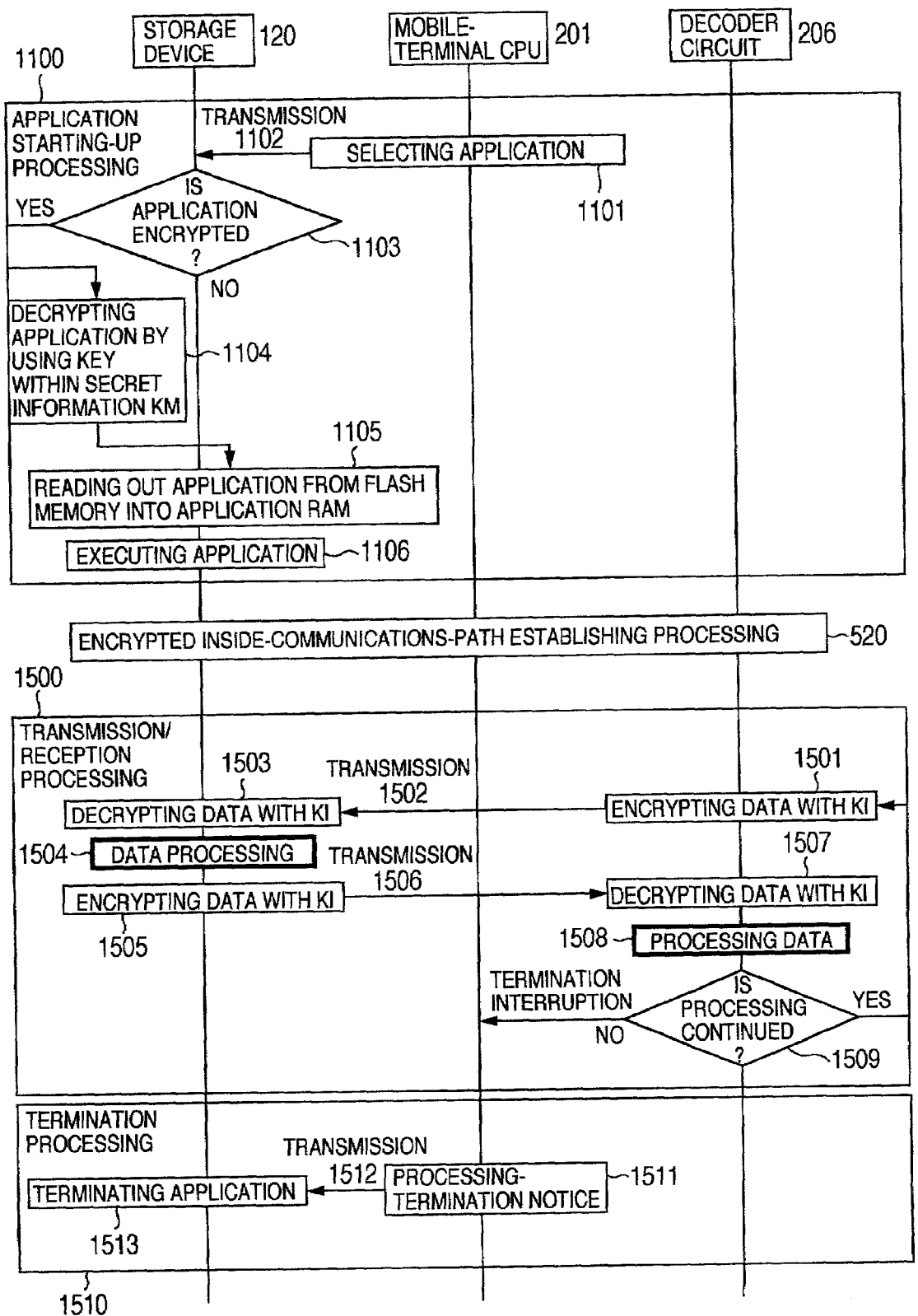
FIG. 16 is a flow diagram for explaining the processing at the time of the reproduction in the present invention.

FIG. 16 is a flow diagram for explaining the details of the communications in FIG. 15.

The processings ranging from the application starting-up processing (1100) to the application executing processing (1106) are the same as those of the flow explained in FIG. 11, and accordingly the explanation thereof will be omitted.

The starting-up of the application executes the encrypted inside-communications-path establishing processing 520, thereby establishing the communications-path between the decoder circuit 206 and the storage device 120. In this case, the communications-path is established using the secret information KL 157 created specifically for the decoder circuit 206.

The execution of a transmission/reception processing 1500 brings about an actual transmission/reception of the data between the storage device 120 and the decoder circuit 206. At this time, taking advantage of the secret information KL 157 used in the encrypted inside-communications-path establishing processing 520, the decoder circuit 206 and the storage device 120 encrypt the data of each other, thus performing the transmission/reception (1501 to 1508). While the transmission/reception processing 1500 is being executed, the decoder circuit 206 performs the control of the mobile terminal 103. When the transmission/reception has been terminated, the decoder circuit 206 sends the CPU 201 of the mobile terminal 103 a command for notify a termination interruption. Having received the command on the termination interruption, the CPU 201 starts a termination processing 1510. Concretely, the CPU 201 of the mobile terminal 103 transmits a processing-termination notice to the storage device 120 (1512), thereby causing the application to be terminated (1513).

Figure 17:
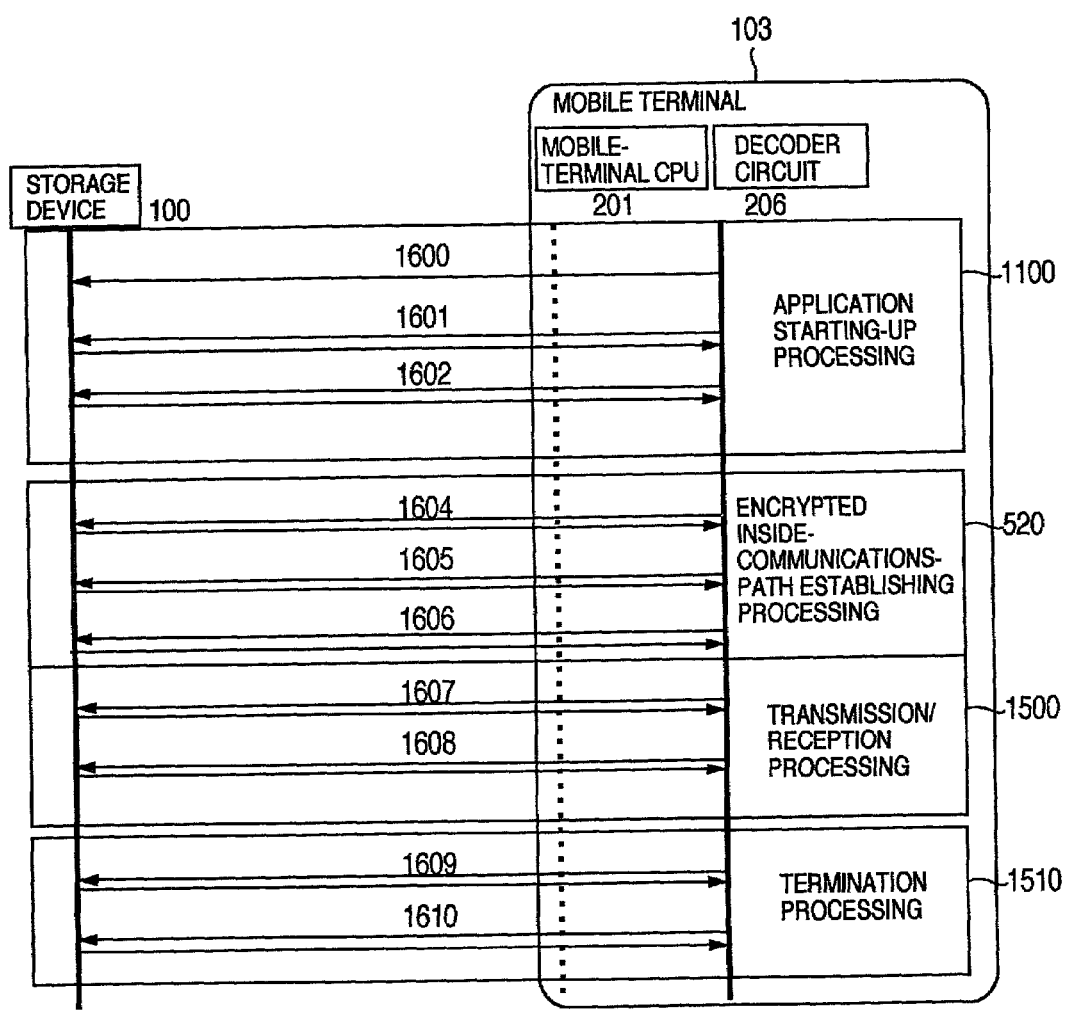
FIG. 17 is a flow diagram for explaining the command exchanges for the license acquisition in the decoder circuit.

FIG. 17 is a diagram for explaining commands for the steps between the decoder circuit 206 and the storage device 120 at the time when the decoder circuit 206 acquires the license 401. The explanation will be given below in a manner of corresponding to FIG. 16. Incidentally, in FIG. 17, the items of "secret information KI 155" given in "Data Location" of the table notation definition 2101 are all replaced by "secret information KL 157". Also, the encryption processing circuit 126 in the storage device 120 generates KS5 by using a random number or the like, and the encryption processing circuit 304 in the decoder circuit 206 generates KS6 by using a random number or the like.

In the application starting-up processing 1100, the following commands are exchanged:

OPEN_CHANNEL 1600 is a command that the decoder circuit 206 issues to the storage device 120 via the storage device interface 207 in the mobile terminal 103 in order to establish the virtual communications-path between the decoder circuit 206 and the storage device 120. Having received the OPEN_CHANNEL 1600 command, the storage device 120 returns the number of the virtual communications-path. The communications hereinafter are performed using this virtual communications-path number.

OPEN_FILE 1601 is a command by which the decoder circuit 206 specifies a file in the storage device 120 where the license 401 has been stored. Having received the OPEN_FILE 1601 command, the storage device 120 returns the allocation number of the specified file. The processings hereinafter are performed using the file allocation number.

VERIFY 1602 is a command by which the decoder circuit 206 issues a certification code for starting up the applications inside the storage device 120. If the storage device 120 verifies that the certification code is an authorized one, the applications inside the storage device 120 are started up. This makes it possible to access the file specified by OPEN_FILE 1601.

In the encrypted inside-communications-path establishing processing 520 where the secret information KL 157 is used, the following commands are exchanged:

VERIFY_CERT 1604 is a command by which the decoder circuit 206 transmits the certificate to the storage device 120. Having received the VERIFY_CERT 1604 command, the storage device 120 verifies the certificate.

SEND_SESSION_KEY 1605 is a command by which the storage device 120 transmits, to the decoder circuit 206, the session key KS5 generated by the encryption processing circuit 126.

ESTABLISH_PLAY_SESSION 1606 is a command by which the decoder circuit 206, after having received KS5, performs the following: Generating the session key KS6 by using the encryption processing circuit 304, and encrypting KS6 by using KS5 so as to transmit the encrypted KS6 to the storage device 120.

In the transmission/reception processing 1500, the following commands are exchanged:

READ_LICENSE 1607 is a command by which the decoder circuit 206 instructs the storage device 120 to make a preparation for the license 401 to be read out. SEND_PLAY_LICENSE 1608 is a command by which the decoder circuit 206 reads out the license 401 from the storage device 120.

In the termination processing 1510, the following commands are exchanged:

CLOSE_FILE 1609 is a command that the decoder circuit 206 issues in order to close the file in the storage device 120.

CLOSE_CHANNEL 1610 is a command that the mobile terminal 103 issues in order to terminate the processing by closing the virtual communications-path that has been utilized between the mobile terminal 103 and the storage device 120.

Figure 18:
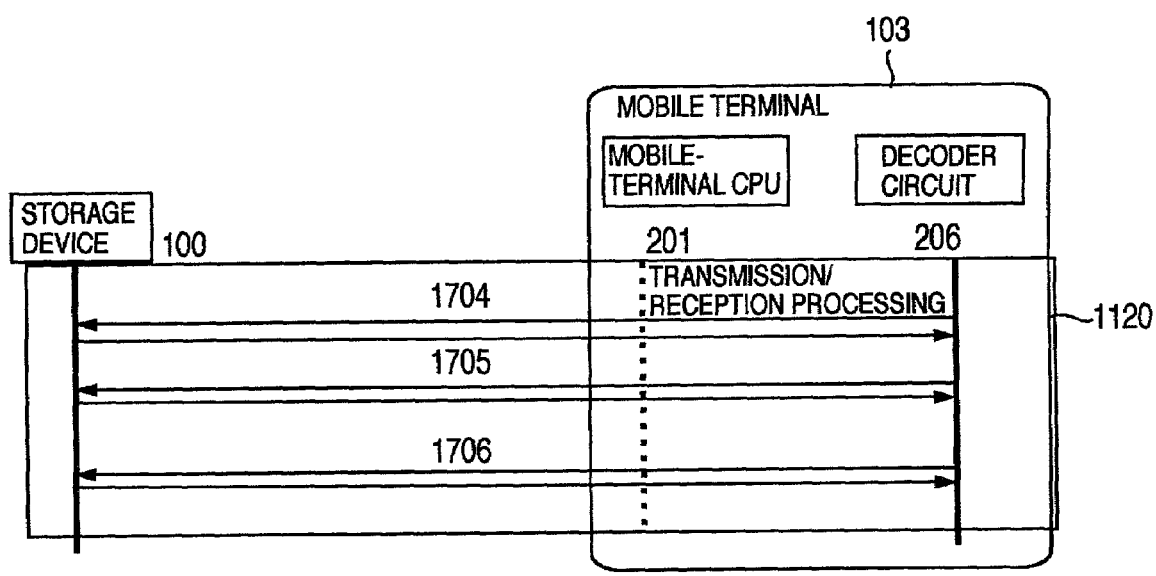
FIG. 18 is a flow diagram for explaining the command exchanges for the content acquisition in the decoder circuit.

FIG. 18 is a diagram for explaining the processing where, after having terminated the acquisition of the license 401, the decoder circuit 206 reads out, from the storage device 120, the encrypted content 402 to be reproduced. Additionally, since the content 402 has been already encrypted, at this step, it is well enough to simply store the data from the storage device 120 into the decoder circuit 206. Consequently, the processing is performed using only the physical access command 408. Using the logical access command 409 is also allowable.

In the processings in FIG. 18, the following commands are exchanged:

SET_BLOCKLEN 1704 is a command by which the decoder circuit 206 transmits, to the storage device 120, the size of the encrypted content 402 to be read out.

SET_BLOCKS_TRANSFERRED 1705 is a command for specifying the amount by which the decoder circuit 206 will read out, at one time, the encrypted content 402 inside the storage device 120.

READ_BLOCK 1706 is a command that the decoder circuit 206 issues in order to perform the following: Specifying, to the storage device 120, the address of the encrypted content 402 to be reproduced, and reading out the encrypted content 402 so as to perform the reproduction.

Employing the configuration like this permits the data to be stored safely and in a large-capacity.

In the present invention, using the storage device including the tamper-resistant module and the large-capacity flash memory, the high-security data is encrypted and stored into the large-capacity flash memory. This makes it possible to configure the inexpensive storage device that allows the large-capacity and high-security data to be stored with the data's security maintained. Also, since the encryption processing is performed inside the storage device, an external appliance need not perform the encryption key acquisition and the encryption/decryption processing. This reduces the burden imposed on the external appliance.

Also, in the present invention, the tamperresistant module includes the CPU. This CPU, depending on the various conditions, judges the security of information transmitted from the outside. Moreover, the CPU stores the high-security information into the non-volatile memory inside the tamper-resistant module, and stores low-security information into the external flash memory. As a result, the data processing becomes faster as compared with the case where all the data are encrypted. What is more, it becomes possible to effectively utilize the record area inside the tamper-resistant module.

Furthermore, in the present invention, the applications to be executed inside the tamper-resistant module are encrypted and stored into the external flash memory. In addition, when required, the applications are read out from the flash memory, then being expanded onto the internal RAM so as to be executable. The employment of this configuration allows the various types of applications to be installed into the storage device at one time. What is more, it becomes possible to execute a large-sized application inside the storage device.

It should be further understood by those skilled in the art that the foregoing description has been made on embodiments of the invention and that various changes and modifications may be made in the invention without departing from the spirit of the invention and scope of the appended claims.

What is claimed is:

1. A storage device, comprising:
a controller and a second non-volatile memory, said controller including a first non-volatile memory, wherein
said controller further includes a first interface for connecting said controller to a host terminal device, a second interface for connecting said controller to said second non-volatile memory, a central processing device, and a volatile memory utilized by said central processing device,
said first non-volatile memory includes a first storage area for storing Km data used for encrypting or decrypting a program to be executed by said central processing device and a second storage area for storing data from said host terminal device,
said second non-volatile memory includes an access-permitted area for storing data from said host terminal device and an access-prohibited area for storing said program encrypted using said Km data, an access by a user being permitted to said access-permitted area but being limited to said access-prohibited area, and
said controller:
stores the data from said host terminal device in said access-permitted area of said second non-volatile memory without encryption, if a security level of the data from said host terminal device is lower than a predetermined level;
checks a free available capacity of said first non-volatile memory, if the security level of the data from said host terminal device is higher than the predetermined level;
stores the data from said host terminal device in said second storage area of said first non-volatile memory, if the free available capacity of said first non-volatile memory is sufficient; and
stores the data from said host terminal device in said access-permitted area of said second non-volatile memory after encrypting the data from said host terminal device by using said Km data, if the free available capacity of said first non-volatile memory is insufficient.

2. The storage device as claimed in claim 1, wherein said Km data includes key information and a program used for said encryption or said decryption processing.

3. The storage device as claimed in claim 1, wherein, in correspondence with a command or an attribute of data from said host terminal device, said controller determines whether to access said first non-volatile memory or to access said second non-volatile memory.

4. The storage device as claimed in claim 1, wherein, in correspondence with a command or an attribute of data from said host terminal device, said controller determines whether or not to encrypt general data, said general data having been received from said host terminal device so as to be written into said second non-volatile memory.

5. The storage device as claimed in claim 1, wherein said first non-volatile memory further includes at least one of a storage area for storing Ko data and a storage area for storing Ki data, said Ko data being used for cipher communication between a server and said host terminal device, said Ki data being used for cipher communication between said server and said storage device, said server being connected to said host terminal device via a network.

6. The storage device as claimed in claim 5, wherein said controller, using said Km data, encrypts at least one program of a program included in said Ko data and a program included in said Ki data, and then writes said encrypted one program into said access-prohibited area.

7. The storage device as claimed in claim 1, wherein said controller is an IC chip, said second non-volatile memory being a flash memory chip.

8. The storage devices a claimed in claim 1, wherein said first non-volatile memory includes a storage area for storing Kl data which said central processing device uses for encryption or decryption according to said program stored in said second non-volatile memory.

9. The storage device as claimed in claim 1, wherein tamper-resistibility of said controller is higher than that of said second non-volatile memory.

10. The storage device as claimed in claim 1, wherein said controller:
   checks an attribute of the data from said host terminal device;
   checks a free available capacity of said first non-volatile memory, if the data from said host terminal device is smaller than a predetermined capacity based on the attribute checked;
   stores the data from said host terminal device in said second storage area of said first non-volatile memory, if the free available capacity of said first non-volatile memory is sufficient;
   stores the data from said host terminal device in said access-permitted area of said second non-volatile memory after encrypting the data from said host terminal device by using said Km data, if the free available capacity of said first non-volatile memory is insufficient; and
   stores the data from said host terminal device in said access-permitted area of said second non-volatile memory after encrypting the data from said host terminal device by using said Km data, if the data from said host terminal device is larger than said predetermined capacity based on the attribute checked.

11. The storage device as claimed in claim 10, wherein if the data from said host terminal device has no attribute, said controller checks the security level of the data from said terminal device.

12. The storage device as claimed in claim 10, wherein, if the security level of the data from said host terminal device is an intermediate level, said controller stores the data from said host terminal device in said access-permitted area of said second non-volatile memory after encrypting the data from said host terminal device by using said Km data without checking the free available capacity of said first non-volatile memory.

13. A host terminal device, comprising:
   a connectable/disconnectable storage device including a controller and a second non-volatile memory, said controller including a first non-volatile memory,
   a first interface for connecting said host terminal device to said storage device, and
   a first central processing device, wherein
   said controller further includes a second interface for connecting said controller to said first interface, a third interface for connecting said controller to said second non-volatile memory, and a second central processing device,
   said first non-volatile memory includes a first storage area for storing Km data used for encrypting or decrypting a program to be executed by said second central processing device and a second storage area for storing data from said host terminal device,
   said second non-volatile memory includes an access-permitted area for storing data from said host terminal device and an access-prohibited area for storing said program encrypted using said Km data, an access by a user being permitted to said access-permitted area but being limited to said access-prohibited area, and
   said controller:
   stores the data from said host terminal device in said access-permitted area of said second non-volatile memory without encryption, if a security level of the data from said host terminal device is lower than a predetermined level;
   checks a free available capacity of said first non-volatile memory, if the security level of the data from said host terminal device is higher than the predetermined level;
   stores the data from said host terminal device in said second storage area of said first non-volatile memory, if the free available capacity of said first non-volatile memory is sufficient; and
   stores the data from said host terminal device in said access-permitted area of said second non-volatile memory after encrypting the data from said host terminal device by using said Km data, if the free available capacity of said first non-volatile memory is insufficient.

14. The host terminal device as claimed in claim 13, wherein
   said first non-volatile memory further stores Ko key information used for cipher communication a server and said host terminal device, said server being connected to said host terminal device via a network,
   said first central processing device reads out said Ko key information from said first non-volatile memory, encrypting said Ko key information by using an encryption key that is capable of being decrypted by said server, and transmitting said encrypted Ko key information to said server,
   said host terminal device then receives, from said server, data encrypted by using said Ko key information.

15. The host terminal device as claimed in claim 13, wherein
   said first non-volatile memory further stores Ki key information used for cipher communication between a server and said storage device, said server being connected to said host terminal device via a network,
   said second central processing device reads out said Ki key information from said first non-volatile memory, encrypting said Ki key information by using an encryption key that is capable of being decrypted by said server, and transmitting said encrypted Ki key information to said server via said host terminal device, and
   said host terminal device then receives, from said server, data encrypted by using said Ki key information and transmitting the data thus received to said storage device.

* * * * *